United States Patent
Ishikawa et al.

(10) Patent No.: US 10,091,475 B2
(45) Date of Patent: Oct. 2, 2018

(54) PROJECTION SYSTEM, IMAGE PROCESSING APPARATUS, AND CALIBRATION METHOD

(71) Applicants: Masaaki Ishikawa, Kanagawa (JP); Yukinaka Uchiyama, Tokyo (JP)

(72) Inventors: Masaaki Ishikawa, Kanagawa (JP); Yukinaka Uchiyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/072,945

(22) Filed: Mar. 17, 2016

(65) Prior Publication Data
US 2016/0295184 A1    Oct. 6, 2016

(30) Foreign Application Priority Data
Mar. 31, 2015 (JP) ................................ 2015-072349

(51) Int. Cl.
H04N 3/223 (2006.01)
H04N 3/227 (2006.01)
H04N 9/31 (2006.01)

(52) U.S. Cl.
CPC .......... *H04N 9/3185* (2013.01); *H04N 3/223* (2013.01); *H04N 9/3147* (2013.01)

(58) Field of Classification Search
CPC ...... H04N 9/31; H04N 9/3185; H04N 9/3147; H04N 3/223; H04N 3/227
USPC ........................................ 348/744, 745, 747
See application file for complete search history.

(56) References Cited

U.S. PATENT DOCUMENTS

| 6,222,593 | B1* | 4/2001 | Higurashi | G03B 37/04 |
| | | | | 315/368.12 |
| 8,445,830 | B2* | 5/2013 | Furui | H04N 9/31 |
| | | | | 250/208.1 |
| 8,586,904 | B2* | 11/2013 | Furui | H04N 9/3147 |
| | | | | 250/208.1 |
| 2003/0142883 | A1 | 7/2003 | Ishii | |
| 2008/0062164 | A1 | 3/2008 | Bassi et al. | |
| 2009/0002637 | A1 | 1/2009 | Harada | |
| 2009/0174868 | A1 | 7/2009 | Matsuda | |
| 2013/0222776 | A1 | 8/2013 | Ishikawa | |
| 2014/0268065 | A1 | 9/2014 | Ishikawa et al. | |

(Continued)

FOREIGN PATENT DOCUMENTS

| JP | 3908255 | 4/2007 |
| JP | 2015-158658 | 9/2015 |

OTHER PUBLICATIONS

Partial European Search Report dated Sep. 13, 2016 in European Patent Application No. 16161601.6.

*Primary Examiner* — Trang U Tran
(74) *Attorney, Agent, or Firm* — Oblon, McClelland, Maier & Neustadt, L.L.P.

(57) ABSTRACT

A projection system, apparatus, and method in which a plurality of projectors project images to form an image as a whole on a projected area which is a screen area on which a content image is projected without a frame. Images for calibration are output by the plurality of projectors, the images for calibration including positioning markers that are indications for positioning to the corners of the projected area. Correction coefficients are calculated based on reference points of the projected area, and a projection target area is defined which corresponds to the screen area.

15 Claims, 19 Drawing Sheets

(56) References Cited

U.S. PATENT DOCUMENTS

2015/0029465 A1    1/2015   Ishikawa et al.
2015/0077573 A1    3/2015   Ishikawa et al.
2015/0213584 A1    7/2015   Ishikawa et al.

\* cited by examiner

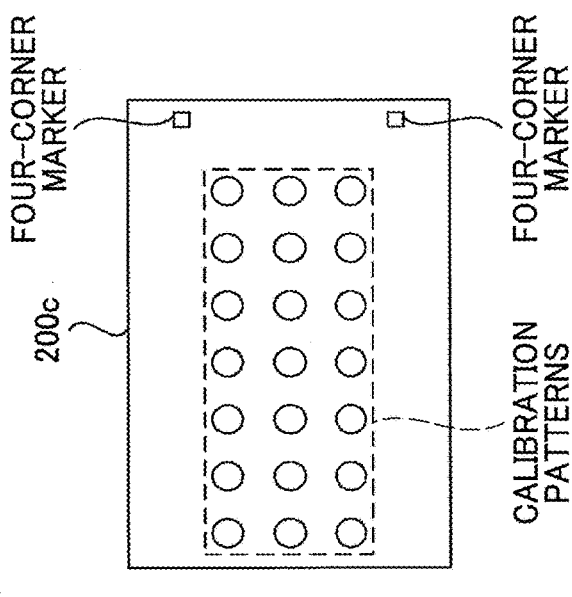
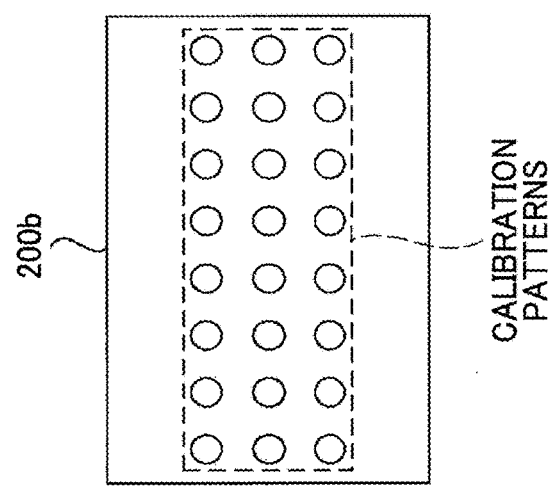
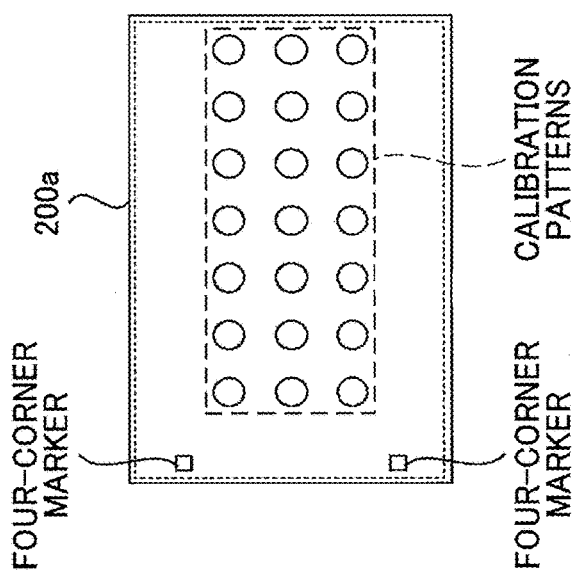

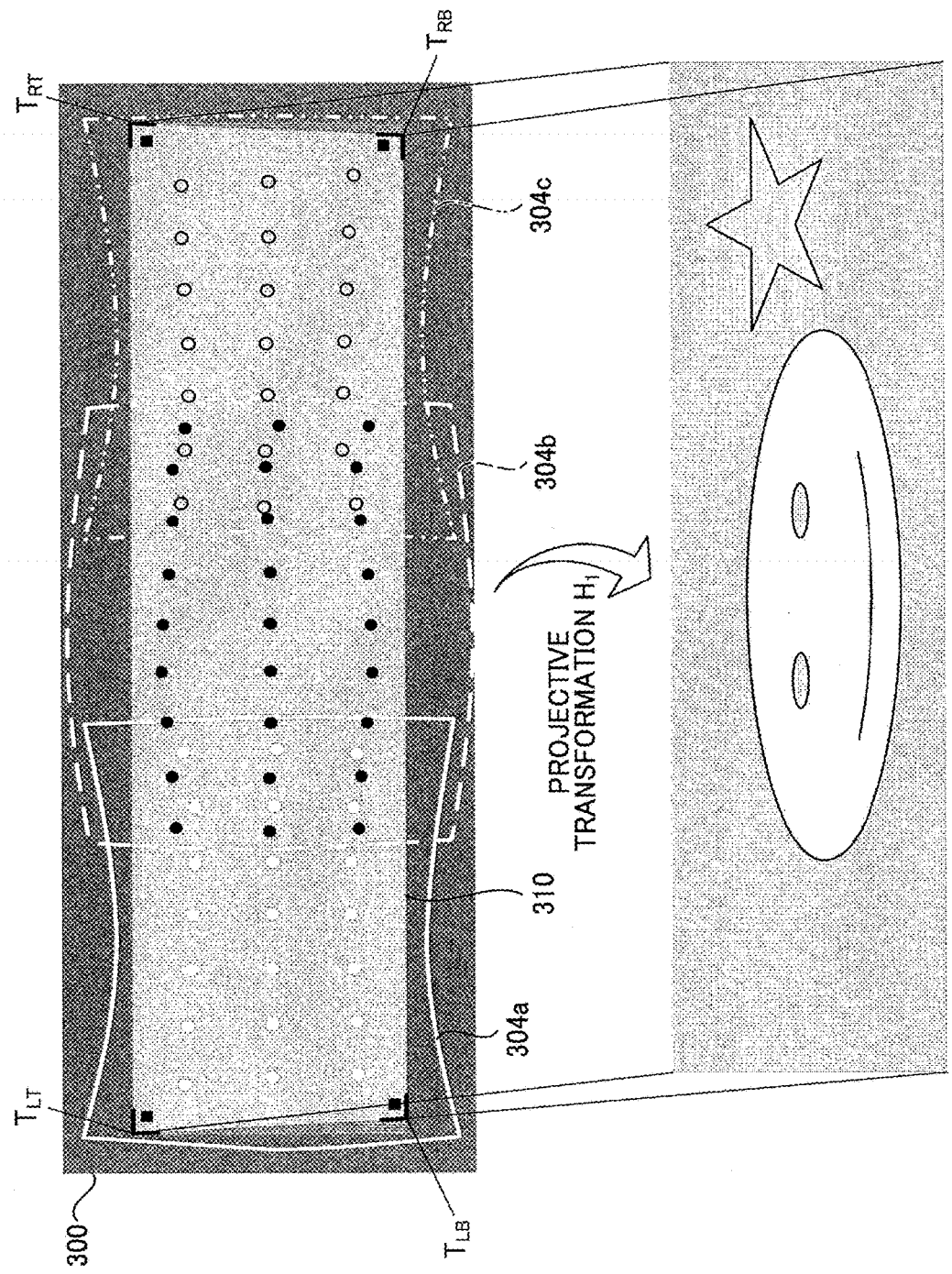

FIG.14A

| PROJECTOR COORDINATES (INTEGER) | | CONTENT COORDINATE (DECIMAL POINT) | |
|---|---|---|---|
| X | Y | X | Y |
| 0 | 0 | ⋮ | ⋮ |
| 1 | 0 | ⋮ | ⋮ |
| 2 | 0 | ⋮ | ⋮ |
| ⋮ | | ⋮ | ⋮ |
| 1279 | 0 | ⋮ | ⋮ |
| 0 | 1 | ⋮ | ⋮ |
| 1 | 1 | ⋮ | ⋮ |
| 2 | 1 | ⋮ | ⋮ |
| ⋮ | ⋮ | ⋮ | ⋮ |
| 1277 | 799 | ⋮ | ⋮ |
| 1278 | 799 | ⋮ | ⋮ |
| 1279 | 799 | ⋮ | ⋮ |

FIG.14B

| PROJECTOR COORDINATES (INTEGER) | | BLENDING COEFFICIENT |
|---|---|---|
| X | Y | |
| 0 | 0 | ⋮ |
| 1 | 0 | ⋮ |
| 2 | 0 | ⋮ |
| ⋮ | | ⋮ |
| 1279 | 0 | ⋮ |
| 0 | 1 | ⋮ |
| 1 | 1 | ⋮ |
| 2 | 1 | ⋮ |
| ⋮ | ⋮ | ⋮ |
| 1277 | 799 | ⋮ |
| 1278 | 799 | ⋮ |
| 1279 | 799 | ⋮ |

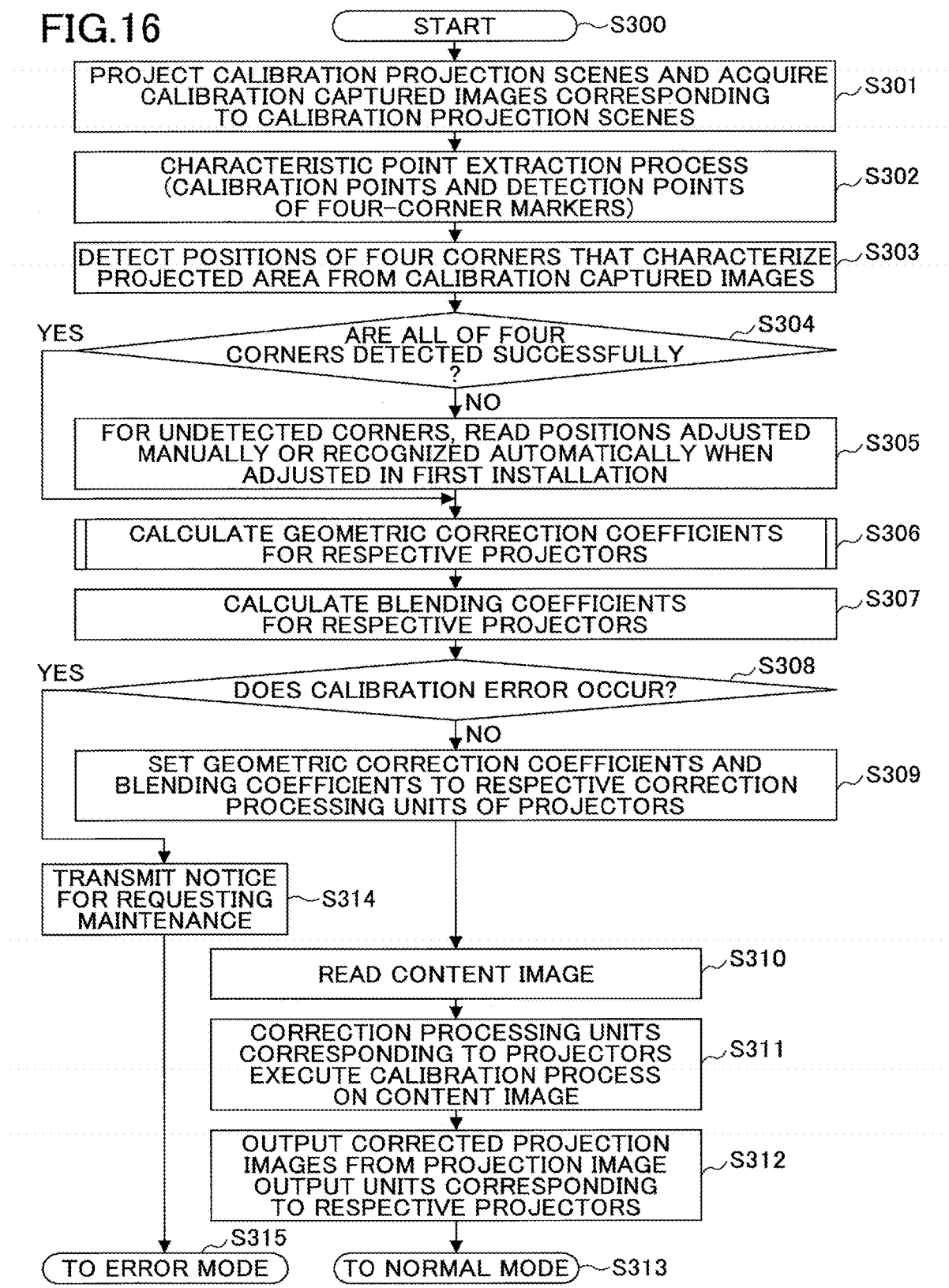

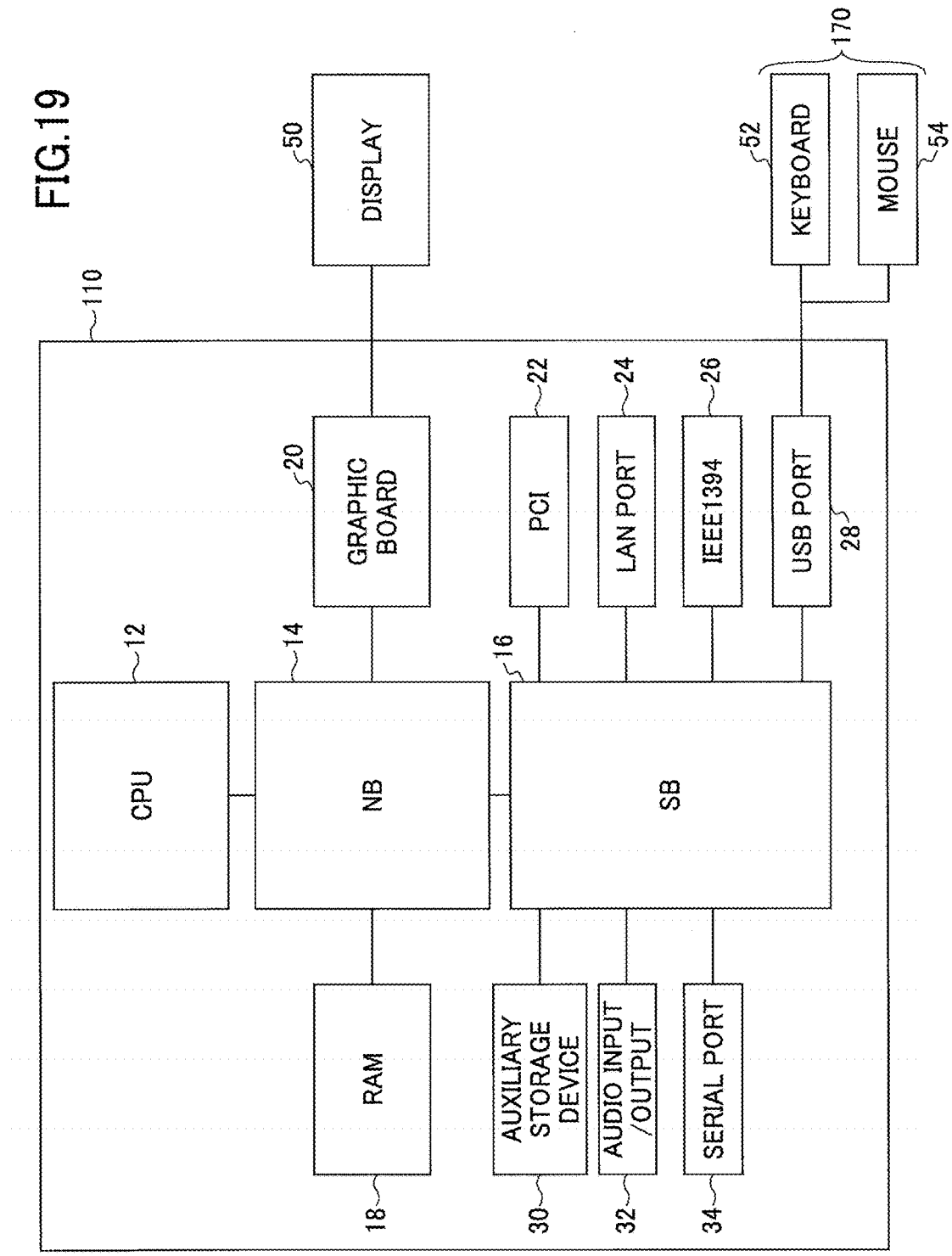

PROJECTION SYSTEM, IMAGE PROCESSING APPARATUS, AND CALIBRATION METHOD

BACKGROUND OF THE INVENTION

1. Field of the Invention

The disclosures herein generally relate to a projection system, an image processing apparatus, and a calibration method.

2. Description of the Related Art

Recently, more and more attention has been paid to a multiple projection technique in which a plurality of projectors are arranged such that projection images from the projectors are overlapped in overlapped areas and a single and high-resolution image can be projected on a screen.

Japanese Patent No. 3908255 discloses an image projection system relating to the multiple projection technique above described. In the image projection system disclosed in Japanese Patent No. 3908255, when calibration is performed, a reference image having four or more characteristic points whose coordinate positions are already known is projected on a screen from respective projectors. Here, the reference image is a known image in which, for example, bright spots or crosses are arranged at constant intervals. Then, positions of the characteristic points on the reference image captured (imaged) by a digital camera are detected. Further, based on the detected positions of the four or more characteristic points of the respective projectors, projection images of the respective projectors are transformed, the overlapped area is detected and a blending process is performed. By projecting the transformed and the blending-processed images on the screen from the projectors such that the images are arranged so as to have the overlapped area, a single and high-resolution image can be projected.

In the related art projection system described above, conditions are assumed in which an image can be projected in a wide screen like a wall without especially taking care of a position of the projection image. On the other hand, there may be a case in which a projection image is desired to be projected to fit within a plane screen which is separated from a wall like a white board with legs for an exhibition event, advertisement or the like, or a projection image is desired to be projected to fit within a projected area of a dedicated screen, which is attached to a wall and which is not separated from the wall, having patterns such as marble stone.

However, in the above described related art, in order to fit the connected projection images within the projected area, manual adjustment is required in which a user operates a control computer while visually checking the projection status. Thus, in a case in which a place where the control computer is located is remote from a place where the screen is located, because the user cannot visually confirm the projection states, the user is required to perform the adjustment while monitoring the video having low resolution by using a Web camera or the like, or cooperation is required in which a plurality of persons contact each other. Thus, it is not sufficient in terms of convenience. When being used as permanent signage, it is inevitable that the projectors become misaligned due to passage of time and/or vibration even after arrangement has been adjusted once. As a result, a minute deviation may degrade image quality extremely. Thus, a technique for easily performing the readjustment is required.

SUMMARY OF THE INVENTION

It is a general object of at least one embodiment of the present invention to provide a projection system, an image processing apparatus, and a calibration method that substantially obviate one or more problems caused by the limitations and disadvantages of the related art.

An embodiment provides a projection system including a plurality of projection units configured to project images to form an image as a whole on a projected area; an output unit configured to output images for calibration to projection units that are in charge of areas of corners of the projected area among the plurality of projection units, the images for calibration including positioning markers that are indications for positioning to the corners of the projected area; a detection unit configured to detect, based on one or more captured images for calibration that are acquired by capturing the projected area and the images for calibration including the positioning markers being projected, reference points that characterize the projected area; and a correction coefficient calculation unit configured to, based on the reference points of the projected area, define a projection target area relative to the projected area and to calculate correction coefficients that correspond to the plurality of projection units, the image as the whole corrected based on the correction coefficients being projected to the projection target area from the plurality of projection units.

BRIEF DESCRIPTION OF THE DRAWINGS

FIGS. 4A, 4B, and 4C are drawings illustrating an example of three images for calibration generated for the three projectors in which projection images are arranged in one line in a horizontal direction;

FIG. 11 is a drawing that depicts mapping the projectable areas of the three projectors on the coordinate system of the captured images, the projection target area and a content image;

FIG. 14A is a table illustrating data structure of the geometric correction coefficients;

FIG. 14B is a table illustrating data structure of the blending coefficients;

FIG. 16 is a flowchart illustrating an example of an overall recalibration process according to the embodiment after first time calibration is executed;

FIG. 19 is a block diagram illustrating a hardware configuration of a general-purpose computer apparatus according to the embodiment.

DESCRIPTION OF THE PREFERRED EMBODIMENTS

In the following, an embodiment of the present invention will be described with reference to the accompanying drawings. However, the present invention is not limited to the embodiment. In the following embodiment, as an example of a projection system, a projection system 100 will be described which includes a plurality of projectors 150, which are projection units, a camera 160, which is an imaging (capturing) unit, and an image processing apparatus 110 which performs overall control.

(Whole Configuration)

Figure 1:
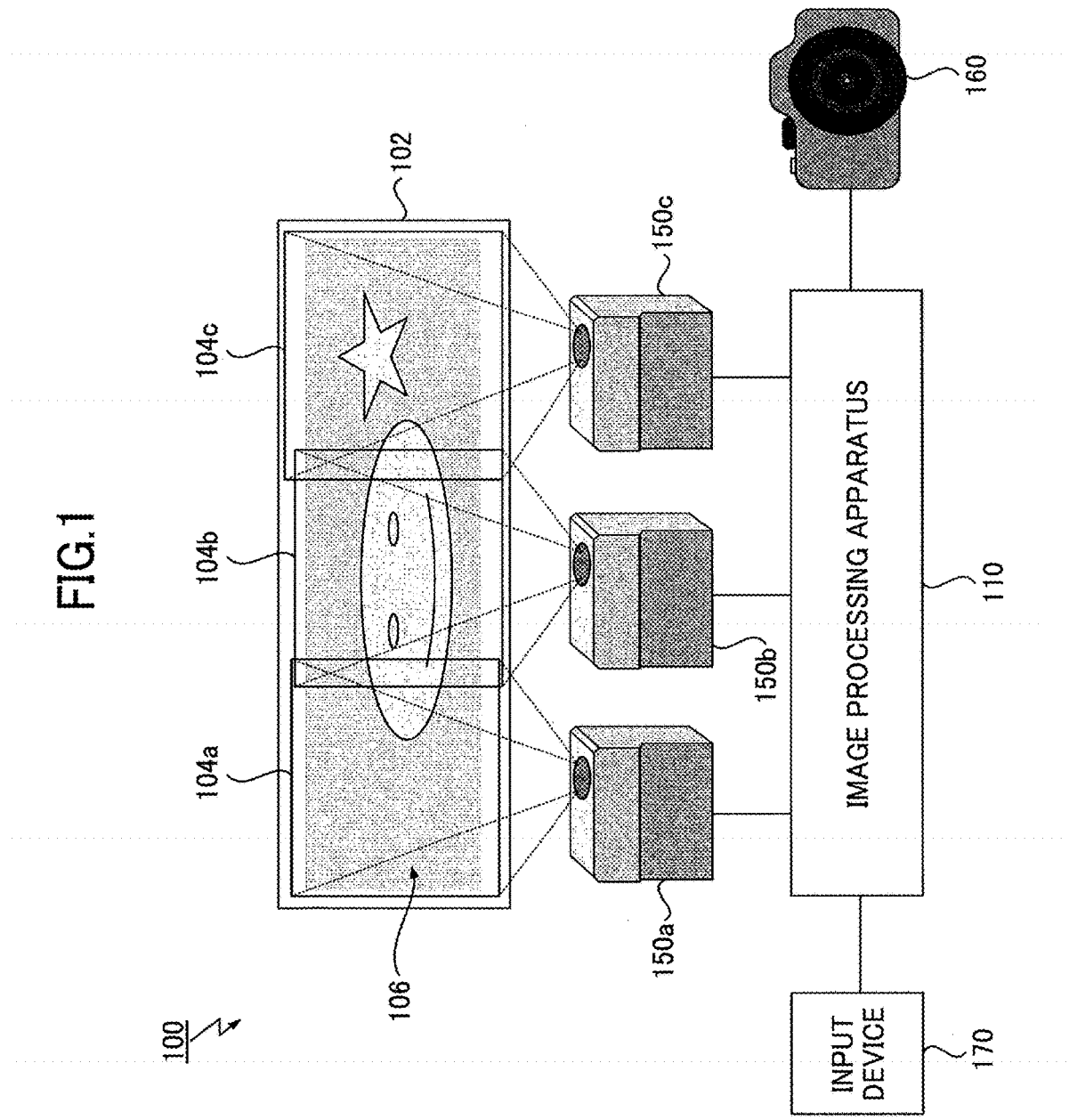
FIG. 1 is a schematic diagram illustrating an example of an overall configuration of a projection system according to an embodiment.

FIG. 1 is a schematic diagram illustrating an example of an overall configuration of the projection system 100 according to an embodiment. The projection system 100 shown in FIG. 1 includes the image processing apparatus 110, which performs overall control of the system, the plurality of projectors 150, a camera 160, and an input device 170. It should be noted that the configuration of the projection system 100 is not limited to a specific configuration. However, in the following description, a case will be described in which projection images of three projectors 150a, 150b, and 150c are combined on a projection surface such that an image based on the combined images is projected in an area that is greater than a projection area of a single projector. That is, the projection system 100 corresponds to a so-called "multiple projection" system.

As the image processing apparatus 110, a general-purpose computer such as a personal computer and a workstation may be typically used. It should be noted that the image processing apparatus 110 is not limited to the general-purpose computer. For example, the image processing apparatus 110 may be implemented as a dedicated controller. Further, the image processing apparatus 110 may be implemented in any of the projectors 150 or in a device such as a tablet computer.

The projectors 150 are projection devices that use a liquid crystal method, a Digital Light Processing (DLP) method, a Liquid Crystal on Silicon (LCOS) method or the like. The camera 160 is an imaging device that includes an image sensor, such as a Complementary Metal Oxide Semiconductor (CMOS) and a Charge Coupled Device (CCD), and an imaging forming optical system such as a lens for forming an image on a light receiving area of the image sensor. The camera 160 may be provided as a dedicated device such as a World Wide Web (WEB) camera, a digital still camera, and a digital video camera. In a preferable embodiment, the camera 160 is suspended from a ceiling and permanently installed. However, the present invention is not limited to this. The camera 160 may be integrated into a device such as a smartphone terminal, and a tablet terminal. Further, the camera 160 may be fixed with a tripod stand every time the camera 160 is installed. "Divisional imaging" may be performed while moving a installed position.

The input device 170 is an input device that includes at least one of a mouse, a keyboard, a touch panel, and an operation panel. The input device 170 can receives instructions from a user. The input device 170 can be used when a condition for generating an image for calibration is input and when a calibration result and a halfway result are finely adjusted. It should be noted that the input device 170 may be a device connected to the image processing apparatus 110, the projectors 150, or the camera 160. Alternatively, the input device 170 may be a device integrated therein.

In the projection system 100, a screen 102 is installed. The screen 102 is a projection body that provides a projected area. In the described embodiment, a projector screen of a white mat or a gray mat that clearly indicates boundaries between the screen and a background such as a wall may be used as the screen 102. The projectors 150 are installed such that projection centers of the respective images projected by the projectors 150 are separated from each other on the screen 102. The image processing apparatus 110 generates a plurality of projection images to be projected by the projectors 150a, 150b, and 150c, and outputs the projection images to the respective projectors 150. The projectors 150 project the respective projection images, input from the image processing apparatus 110, on the screen 102. On the screen 102, as shown in FIG. 1, a plurality of projection images 104a, 104b, and 104c are projected by the respective projectors 150a, 150b, and 150c. The projection images 104a, 104b, and 104c are combined on the projection surface to form a single projection image 106 within the screen 102.

In the projection system 100, a calibration process is usually performed before projection (a projection mode). The camera 160 shown in FIG. 1 is used in the calibration process (calibration mode). During the calibration mode, the image processing apparatus 110 outputs, to the respective projectors 150, images used for calibration, and causes the projectors 150 to project the respective projection images on the screen 102. In the following, the image used for calibration is referred to as the "calibration image", and the image in which the image used for calibration is projected is referred to as the "calibration projection image" as appropriate. Then, a view point and a view field of the camera 160 are set such that the calibration projection images projected by the projectors 150 on the screen 102 fit within an angle of view, and capturing for calibration is performed. The image processing apparatus 110 performs the calibration process using one or more captured images (in the following, the captured image in which the calibration projection image is included (captured) is referred to as the "calibration captured image" as appropriate). After completing the calibration, the image processing apparatus 110 performs projection of a content image while correcting the content image based on the calibration result.

Figure 2A:
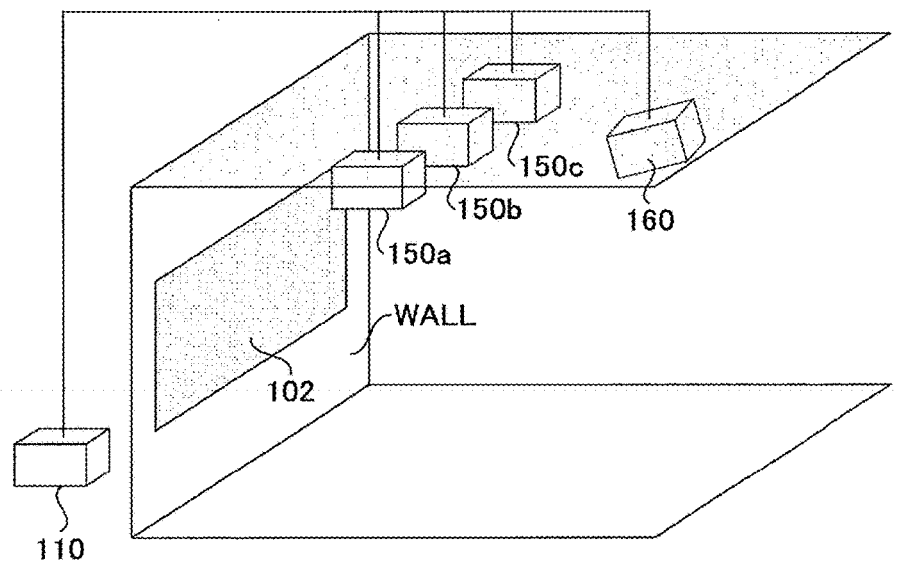
FIGS. 2A and 2B are drawings illustrating an example of installation of a screen, an image processing apparatus, projectors, and a camera of the projection system according to the embodiment.
Figure 2B:
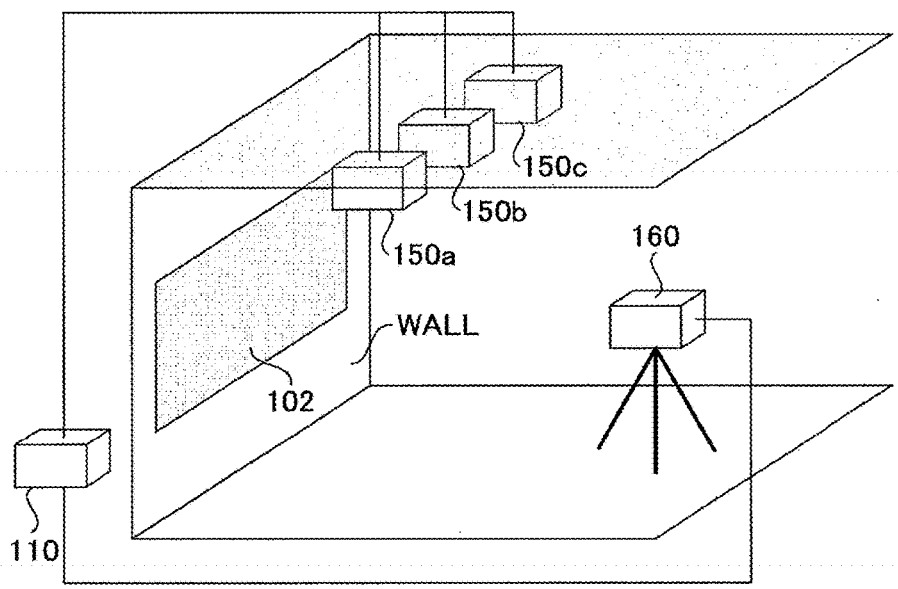

FIGS. 2A and 2B are drawings illustrating examples of installation of the screen 102, the image processing apparatus 110, the projectors 150, and the camera 160 of the projection system 100 according to the embodiment. FIG. 2A shows an example of installation in which the camera 160 is suspended from a ceiling and permanently installed. FIG. 2B shows an example of installation in which the camera 160 is temporarily fixed with a tripod stand.

During the calibration mode, usually, normally, the user may perform visual and manual adjustment such that the connected projection images fit within the screen 102. However, as shown in FIGS. 2A and 2B, in a case in which a place where the image processing apparatus 110 operated by the user is installed is remote from a place where the screen 102 processing apparatus 110 while visually confirming the projection status to the screen 102 by oneself. Thus, it is required to perform the adjustment while monitoring the video having low resolution by using a Web camera. Alternatively, cooperation is required in which a plurality of persons contact each other.

Thus, in the described embodiment, the projection system 100 includes a function for automatically detecting reference points (in a case in which the screen 102 is a quadrilateral, the reference points are four corners) that characterize the projected area of the screen 102. That is, the projection system 100 outputs the calibration images (images for calibration) to the projectors 150 (in the example shown in FIGS. 1 and 2, the projectors 150a and 150c) that are in charge of the corner areas of the projected area of the screen 102. The calibration images include four-corner markers that are indications (marks) for positioning to the corners of the screen 102. Then, the projection system 100 detects the reference points that characterize the projected area of the screen 102 based on the calibration captured images (captured images for calibration) acquired by the camera 160 capturing the screen 102 and the calibration images including the positioning markers being projected. The projection system 100 defines a projection target area relative to the projected area. The image as a whole is projected to the projection target area by the plurality of projectors 150 (in the example shown in FIGS. 1 and 2, the projectors 150a through 150c) based on the reference points of the projected area, to calculate correction coefficients corresponding to the projectors 150a through 150c. In other words, the image as the whole corrected based on the correction coefficients are projected to the projection target area from the plurality of projectors 150.

According to the above described configuration, the physical workload of the calibration when installing the projectors 150 and the camera 160 can be automated. Further, when the plurality of projectors 150 are used for projecting the image as a whole, the projected area can be detected based on the calibration captured images, and the calibration for fitting the projection image as a whole into the projected area can be easily performed. In the following, with reference to FIG. 3, a functional configuration will be described related to the calibration process and the projection process after the calibration.

(Functional Configuration)

Figure 3:
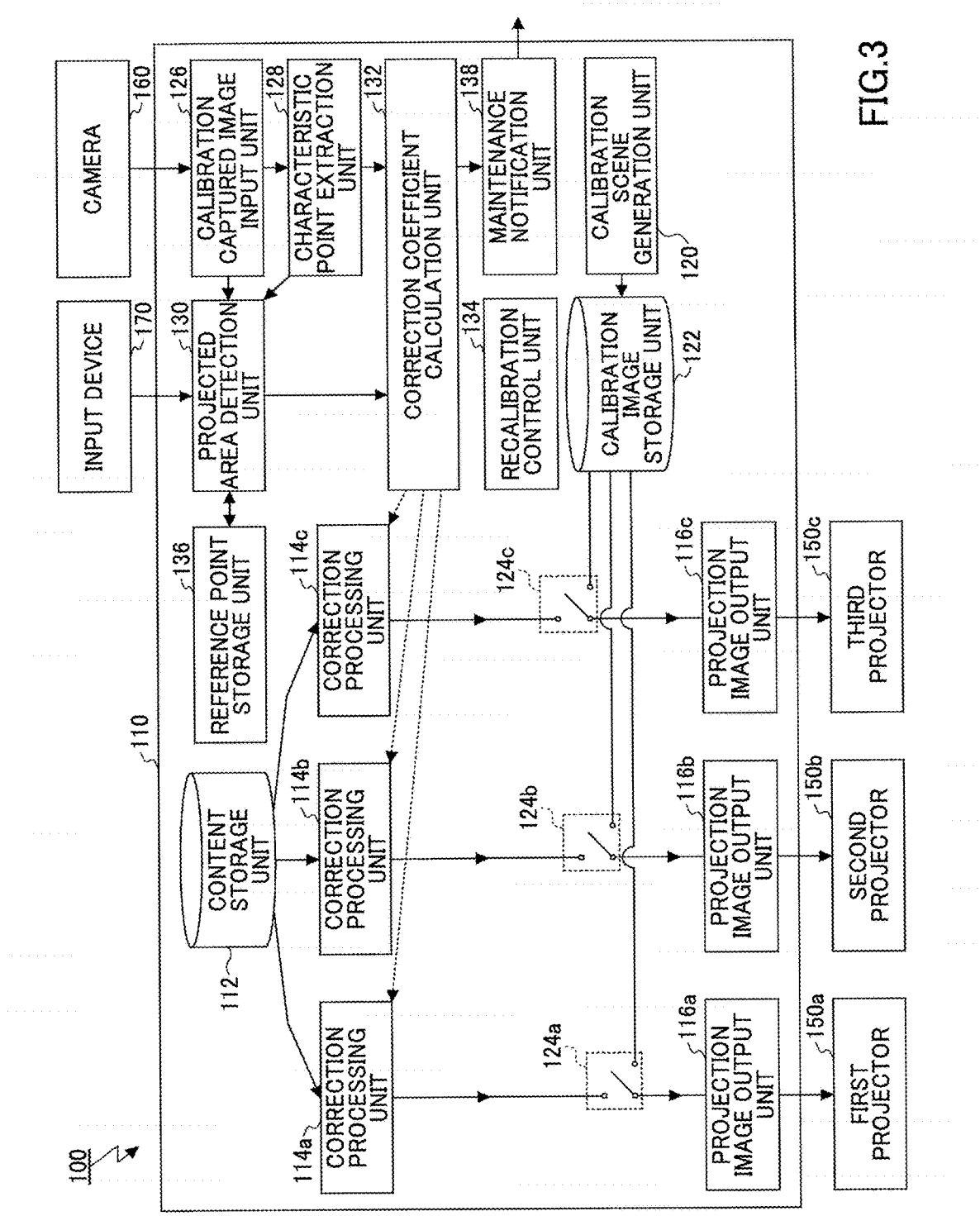
FIG. 3 is a block diagram illustrating a functional configuration of the projection system according to the embodiment.

FIG. 3 is a block diagram illustrating a functional configuration of the projection system 100 according to the embodiment. The projection system 100 includes a content storage unit 112. The projection system 100 further includes, for the corresponding projectors 150a, 150b, and 150c, correction processing units 114a, 114b, and 114c, projection image output units 116a, 116b, and 116c, and switching units 124a, 124b, and 124c. The projection system 100 further includes a calibration scene generation unit 120, a calibration image storage unit 122, a calibration captured image input unit 126, a characteristic point extraction unit 128, a projected area detection unit 130 and a correction coefficient calculation unit 132.

The content storage unit 112 stores a content image that is a signal source to be projected as the single projection image 106. As the content storage unit 112, a Random Access Memory (RAM), a Hard Disk Drive (HDD), a Solid State Drive (SSD), a detachable removable medium or the like having a memory area may be used.

It should be noted that the content image is not limited to this. The content image to be projected may be given as a still image file or given as a display screen generated by execution of an Operating System or an application such as presentation. The content image to be projected may be given as a frame at an arbitrary timing in a moving image file. In the following, for the convenience of description, a case will be described as an example in which a still image is given as the content image.

The correction processing units 114a, 114b, and 114c are provided so as to correspond to the projectors 150a, 150b, and 150c included in the projection system 100. Each of the correction processing units 114 reads the content image from the content storage unit 112, and performs the correction process on the content image to generate the projection image for the corresponding projector 150.

The projection image output units 116a, 116b, and 116c are provided so as to correspond to the projectors 150a, 150b, and 150c included in the projection system 100. Each of the projection image output units 116 includes a display output interface connected to the corresponding projector 150, and outputs, to the connected projector 150, the input image selected by the switching unit 124.

The switching units 124a, 124b, and 124c switch flows of image signals based on an operation mode of the projection system 100. During the projection mode for projecting the content image, the switching units 124 switch input sides to outputs of the correction processing units 114. During the calibration mode, the switching units 124 switch input sides to outputs of the calibration image storage unit 122.

The calibration image storage unit 122 stores the calibration images to be projected from the projectors 150 during the calibration mode. As the calibration image storage unit 122, a RAM, a HDD, a SSD, a detachable removable medium or the like having a memory area may be used.

In the calibration process according to the embodiment, capturing (imaging) for calibration is performed separately in a plurality of times. The image processing apparatus 110 reads the calibration images from the calibration image storage unit 122, and causes the projectors 150a through 150c to output the respective calibration images in a timely manner. At this time, the image processing apparatus 110 recognizes the positional relationships of the projection images of the projectors 150a through 150c. Further, the image processing apparatus 110 selects the calibration images in accordance with steps of the calibration process and causes the projectors 150 to project the selected calibration images in order to acquire the calibration results of all the projectors 150 necessarily and sufficiently as a whole. In the following, scenes formed by the respective projectors 150 projecting images in respective steps of the calibration process are referred to as "calibration projection scenes" as appropriate.

The calibration images, which form the above described calibration projection scene, are typically generated as still images by the calibration scene generation unit 120. The calibration scene generation unit 120 generates the calibration images optimized for the projectors 150 based on input, from the user, of installation conditions of the projectors 150 and the shape characteristics of the screen 102.

FIGS. 4A, 4B, and 4C are drawings illustrating an example of the three calibration images generated for the projectors 150a through 150c in which the projection images are arranged in one line in the horizontal direction. The calibration images in FIGS. 4A through 4C are generated based on the number of projectors 150, an aspect ratio of the screen 102, and an aspect ratio of the projectors 150 under conditions that predetermined width overlapped areas of the projection images between the projectors 150 adjacent to each other are secured at least.

As shown in FIG. 4, the calibration images 200a, 200b, and 200c include respective arrangements of calibration patterns defining calibration points for detecting a distortion of the projection images. The arrangement of the calibration patterns defines coordinates on the projector memory, and serves as the pattern in which arbitrary figure elements are arranged based on a predetermined rule. The arrangement of the calibration patterns projected on the screen 102 is captured by the camera 160, and a group of the calibration points are extracted and the coordinates thereof are detected. As a result, trapezoidal distortions and local distortions of the projection images projected by the projectors 150 can be detected.

Further, in a specific embodiment, in the calibration images for the projectors 150 that are in charge of the outer side areas of the screen 102, margin sections are formed on outer sides of the arrangement of the calibration patterns such that the arrangement of the calibration patterns can be projected within the screen 102 while having the overlapped areas of the arrangement of the calibration patterns between the adjacent projectors 150.

Further, in the calibration images generated for the left-end and the right-end projectors 150a and 150c that are in charge of the areas of the corners of the screen 102, four-corner markers are formed on the outer sides of the calibration pattern areas. The four-corner markers are indications for positioning to the four corners of the screen 102. A user may adjust the projection angles and zooms of the projectors 150 such that the projected four-corner markers are arranged within the screen 102.

The four-corner markers serve as positioning markers that are indications for positioning to the corners of the projected area according to the embodiment. The projection image output units 116a and 116c, which output the calibration images including the generated four-corner markers to the projectors 150a and 150c that are in charge of the corners of the screen 102, serve as an output unit according to the embodiment.

It should be noted that although the specific patterns have been described above with reference to FIGS. 4A through 4C, the calibration patterns and the four-corner markers are not limited to these. The calibration patterns and the four-corner markers may be arbitrary figure elements.

Referring back to FIG. 3, the camera 160 is fixed in order to fit the projected calibration images within an angle of view of the camera 160. The camera 160 captures (images) the projected calibration projection image for each of the calibration projection scenes. Each of the calibration captured images captured by the camera 160 is transmitted to the image processing apparatus 110 via a wireless connection, such as a wireless Local Area Network (LAN), Bluetooth (registered trademark) and a Wireless Universal Serial Bus (USB), or a wired connection such as a wired USB, and a wired LAN. Otherwise, the captured image may be read by the image processing apparatus 110 via a removable medium such as an SD card (registered trademark), and a Compact Flash (registered trademark). The calibration captured image input unit 126 receives an input of the captured images from the camera 160. The calibration captured image input in the calibration captured image input unit 126 is transmitted to the characteristic point extraction unit 128 and the projected area detection unit 130.

The characteristic point extraction unit 128 extracts, from each of the one or more calibration captured images described above, the calibration points of the arrangement of the calibration patterns and detection points of the four-corner markers. The information about coordinates of the calibration points extracted by the characteristic point extraction unit 128 is transmitted to the correction coefficient calculation unit 132. The information about coordinates of the detection points of the four-corner markers extracted by the characteristic point extraction unit 128 is transmitted to the projected area detection unit 130.

The projected area detection unit 130 detects the reference points that characterize the projected area of the screen 102 based on the transmitted detection points of the four-corner markers and the calibration captured images. The reference points are detected, in areas starting from the detection positions of the four-corner markers, by detecting boundaries between the screen 102 and the background (for example, a wall) in the calibration captured images that have been captured. The projected area detection unit 130 serves as a detection unit according to the embodiment.

Further, in a case in which at least one of the four corners cannot be detected, for the insufficient undetected reference points, the projected area detection unit 130 can use the detection positions of the four-corner markers as the reference points. In this case, the input device 170 may provide a moving instruction receiving unit that receives moving instructions to move the coordinates of the reference points. For example, by displaying, on a display of the image processing apparatus 110, the calibration captured image being captured and current positions of the reference points in the calibration captured image being captured and receiving an operation, from the user, for indicating coordinate points, the coordinates of the reference points can be determined. The operation may be performed by moving a mouse or a cursor. Similarly, in a case in which the user is not satisfied with the detection result, a moving instruction receiving unit that receives moving instructions to move the coordinates of the reference points may be provided.

The correction coefficient calculation unit 130 calculates correction coefficients corresponding to the projectors 150a through 150c based on the transmitted calibration points. More specifically, the correction coefficient calculation unit 130 defines a projection target area, to which the image as a whole is to be projected by the projectors 150a through 150c, based on the received reference points. Then, the correction coefficient calculation unit 132 calculates correction coefficients corresponding to the projectors 150a through 150c based on the defined projection target area and the groups of the calibration points of the respective projectors 150.

Geometric correction coefficients and blending coefficients of the projected images are calculated as the correction coefficients, and are set in the correction processing units 114a through 114c. The geometric correction coefficients are correction coefficients in which geometric correction factors such as position alignment, scale alignment, and distortion correction are included (considered). The blending coefficients are correction coefficients that are used for adjusting colors and brightness when images are superimposed in an overlapped area.

The correction processing units 114a through 114c generate the projection images to be output from the projectors 150a through 150c based on the content image to be projected as a whole by using the various correction coefficients that are calculated. During the projection mode for projecting the content image, the switching units 124 switch input sides to outputs of the correction processing units 114. Accordingly, the projection image output units 116a through 116c output the respective projection images that are given as the processing results of the corresponding correction processing units 114a through 114c.

It should be noted that in a preferable embodiment, the image processing apparatus 110 further includes a recalibration control unit 134, a reference point storage unit 136, and a maintenance notification unit 138.

The recalibration control unit 134 controls execution of a recalibration process in response to an event. The recalibration process includes re-execution in which the calibration images are projected again, the screen 102 and the projected calibration image are captured again, the calibration points of the respective projectors 150 are extracted again, the reference points that characterize the projected area of the screen 102 are detected again, and the correction coefficients for the projectors 150a through 150c are calculated again. The event that is a trigger for starting the recalibration process may be, for example, an event in which an operation, performed to the image processing apparatus 110, the projectors 150, or the camera 160, for clearly instructing to start the recalibration process from the user is detected, an event in which a predetermined schedule comes, and/or another predefined event. Arbitrary predefined timing such as each day, each week, each month, first day of each month, and a predetermined maintenance day may be the predetermined schedule. For example, an event in which the system is started or restarted, an event in which an acceleration sensor detects movement equal to or greater than a predetermined amount when the acceleration sensor is mounted may be the other predefined event. The recalibration process can be executed in response to these events. The recalibration control unit 134 serves as a control unit according to the embodiment.

The reference point storage unit 136 stores the coordinates of the reference points that define, when the above described correction coefficients are calculated, the projection target area. In a case in which detection of reference points fails (one or more reference points cannot be detected) in the recalibration process, the coordinates of the reference points stored in the reference point storage unit 136 are used as alternative coordinate values. In the recalibration, the projected area detection unit 130 uses the reference points stored in the reference point storage unit 136 for insufficient reference points (undetected reference points) when the recalibration is performed. In the recalibration, the correction coefficient calculation unit 132 receives reacquired reference points and receives re-extracted calibration points from the characteristic point extraction unit 128 to redefine the projection target area. Based on them, the correction coefficient calculation unit 132 recalculates correction coefficients for the plurality of projectors 150.

Preset contact addresses of a manager and a maintainer (person who is in charge of maintenance) are registered (stored) in the maintenance notification unit 138. In response to an occurrence of an error when the above described recalibration is executed, the maintenance notification unit 138 transmits, to the registered contact addresses, notice for requesting the maintenance. In a preferable embodiment, the maintenance notification unit 138 can transmit various images and/or various kinds of information that indicate a situation causing the error in addition to the notice for requesting the maintenance. The notice is not limited specifically. For example, an e-mail message, a short message service (SMS) message, or an instant message may be transmitted as the notice. The maintenance notification unit 138 serves as a registration unit and a transmission unit according to the embodiment.

It should be noted that, in the embodiment shown in FIG. 3, a case is described in which the elements (function units) 112 through 138 are implemented in a single image processing apparatus 110. However, the projection system 100 of the present invention is not limited to the system shown in FIG. 3. For example, in another embodiment, in order to reduce the workload focused on the image processing apparatus accompanied by increase of the number of projectors, the functions of the correction processing units 114a through 114c may be implemented in the respective projectors 150a through 150c. Further, in another embodiment, the elements (function units) 112 through 138 may be distributed and implemented in a plurality of image processing apparatuses 110 or all the elements (function units) 112 through 136 may be implemented in any of the projectors 150. Further, a single apparatus having the functions of the image processing apparatuses 110 and the projectors 150 may be provided. Moreover, in another embodiment, the functions of the characteristic point extraction unit 128, the projected area detection unit 130 and the correction coefficient calculation unit 132 may be implemented in a server that provides the functions via a network.

(Overall Process Flow)

Figure 5:
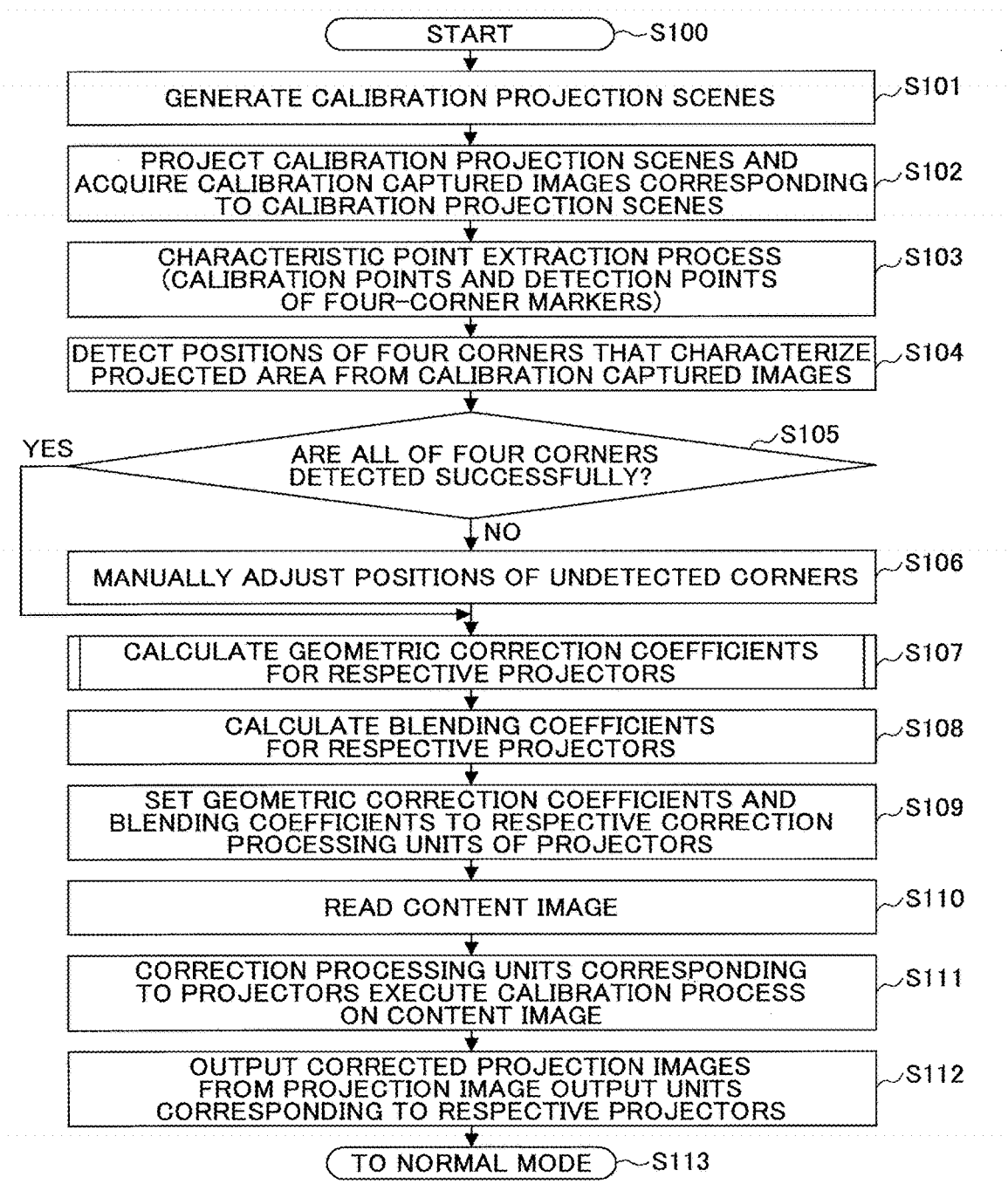
FIG. 5 is a flowchart illustrating an example of an overall calibration process according to the embodiment.

In the following, an overall process flow of the calibration process according to the first embodiment will be described with reference to a flowchart shown in FIG. 5. FIG. 5 is a flowchart illustrating an example of an overall calibration process according to the embodiment. It should be noted that the process flow shown in FIG. 5 is executed when the projectors 150 are installed the first time or when arrangement of the projectors 150 is changed. The process shown in FIG. 5 starts from step S100 in response to an instruction to start the calibration process from a user.

In step S101, the image processing apparatus 110 generates the respective calibration images based on conditions (including the installation conditions of the projectors 150 and the shape characteristics of the screen 102) that is input from the user, and further generates the calibration projection scenes. It should be noted that because it is assumed in the embodiment that calibration is performed while the boundaries between the projected area of the screen 102 and the background are indicated clearly, the conditions input from the user may include designation whether the boundaries are clearly indicated such that another process flow can be executed when the boundaries are not clearly indicated. In step S102, the image processing apparatus 110 causes the projectors 150a through 150c to sequentially project the generated calibration projection scenes, and acquires the calibration captured images that are captured by the camera 160 corresponding to the calibration projection scenes.

Figure 6:
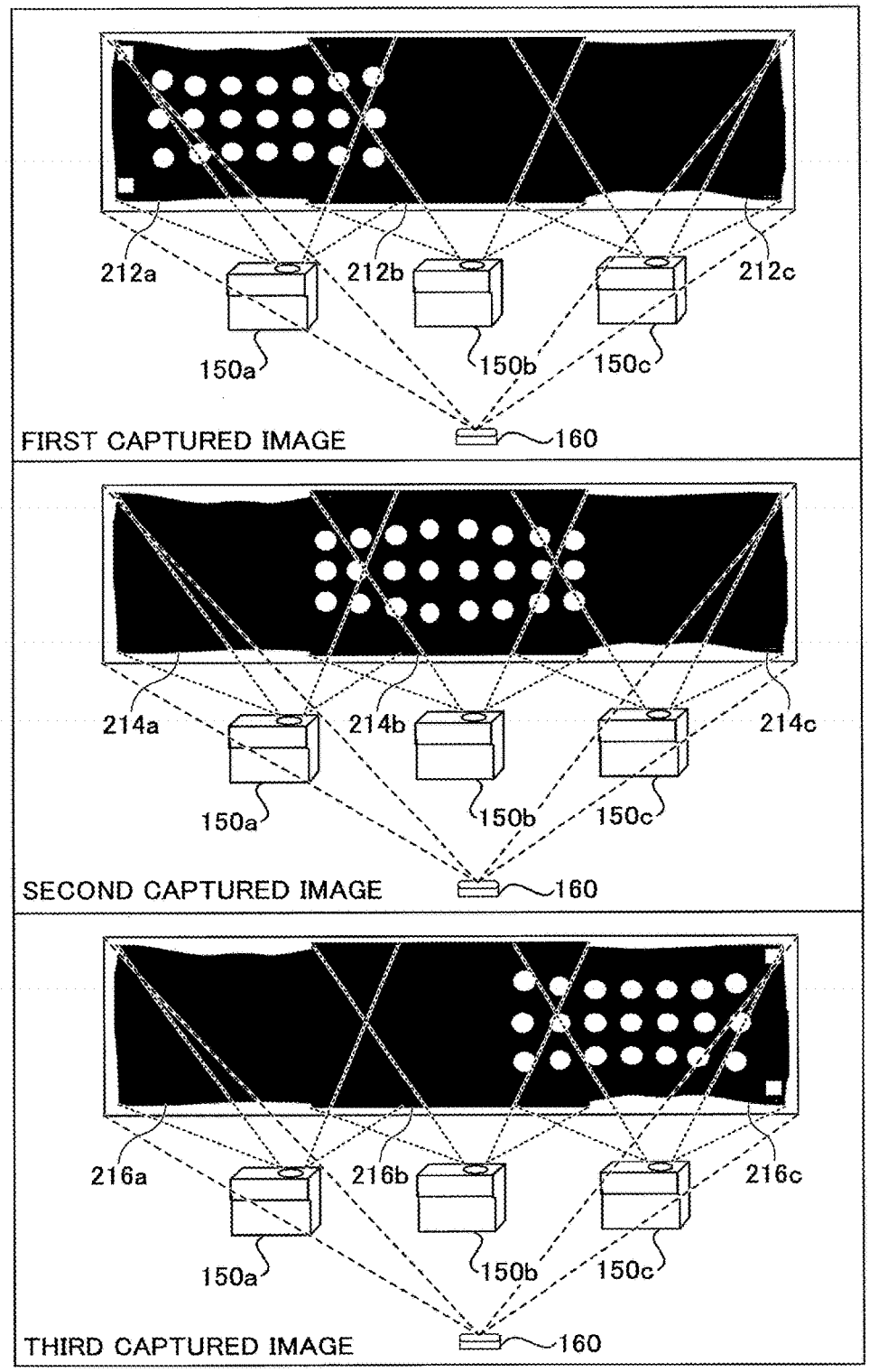
FIG. 6 is a drawing illustrating examples of calibration projection scenes which are projected from the plurality of projectors caused by the image processing apparatus.

FIG. 6 is a drawing illustrating examples of the calibration projection scenes which are projected by the projectors 150a through 150c caused by the image processing apparatus 110. FIG. 6 shows three calibration projection scenes in which the projectors 150a through 150c sequentially project the three calibration images shown in FIGS. 4A through 4C.

In the example of FIG. 6, in a first calibration projection scene of a first capturing, the image processing apparatus 110 causes the first projector 150a to project a first calibration image shown in FIG. 4A and causes the second and the third projectors 150b and 150c not to project images. In a second calibration projection scene of a second capturing and a third calibration projection scene of a third capturing, similar to the first calibration projection scene of the first capturing, a second calibration image and a third calibration image are projected from the second projector 150b and the third projector 150c, respectively. While one projector projects the calibration image, the other projectors do not project any image.

The camera 160 performs capturing a plurality of times in each of the above steps, such that the whole of the projection images 212, 214, and 216, which are projected by the all the connected projectors 150a through 150c, can be fit within the angle of view of the camera 160. The calibration captured images corresponding to the calibration projection scenes from the camera 160 are collectively or sequentially acquired by the image processing apparatus 110, and the process goes to step S103. Alternatively, the captured images may be streamed (delivered) to the image processing apparatus 110 from the camera 160, and the image processing apparatus 110 may obtain frame images corresponding to timings of the above described steps.

In step S103, the image processing apparatus 110 performs a characteristic point extraction process to extract characteristic points from each of the one or more acquired calibration captured images. In the characteristic point extraction process, the detection positions of the four-corner markers and the coordinate positions of the groups of the calibration points of the respective projectors 150 are extracted in the coordinate system of the captured images.

In the characteristic point extraction process, first, the image processing apparatus 110 detects the calibration patterns (circular shape) of the projections images of the respective projectors 150 in the respective captured images. Then, the image processing apparatus 110 extracts the coordinates of the geometric center of the calibration patterns in the coordinate system of the captured images as the coordinates of the calibration points (for example, having decimal point accuracy). In this case, the circular coordinates of the geometric center can be calculated by, for example, binarizing an image and cutting out a mass of white pixels using pattern matching or the like, and acquiring the coordinates of the geometric center thereof. Similarly, from the plurality of captured images, the coordinates of the geometric center of the four-corner markers in the coordinate system of the respective captured images are detected, and the coordinates of the geometric center thereof are extracted as the coordinates of the detection points of the markers.

Figure 7:
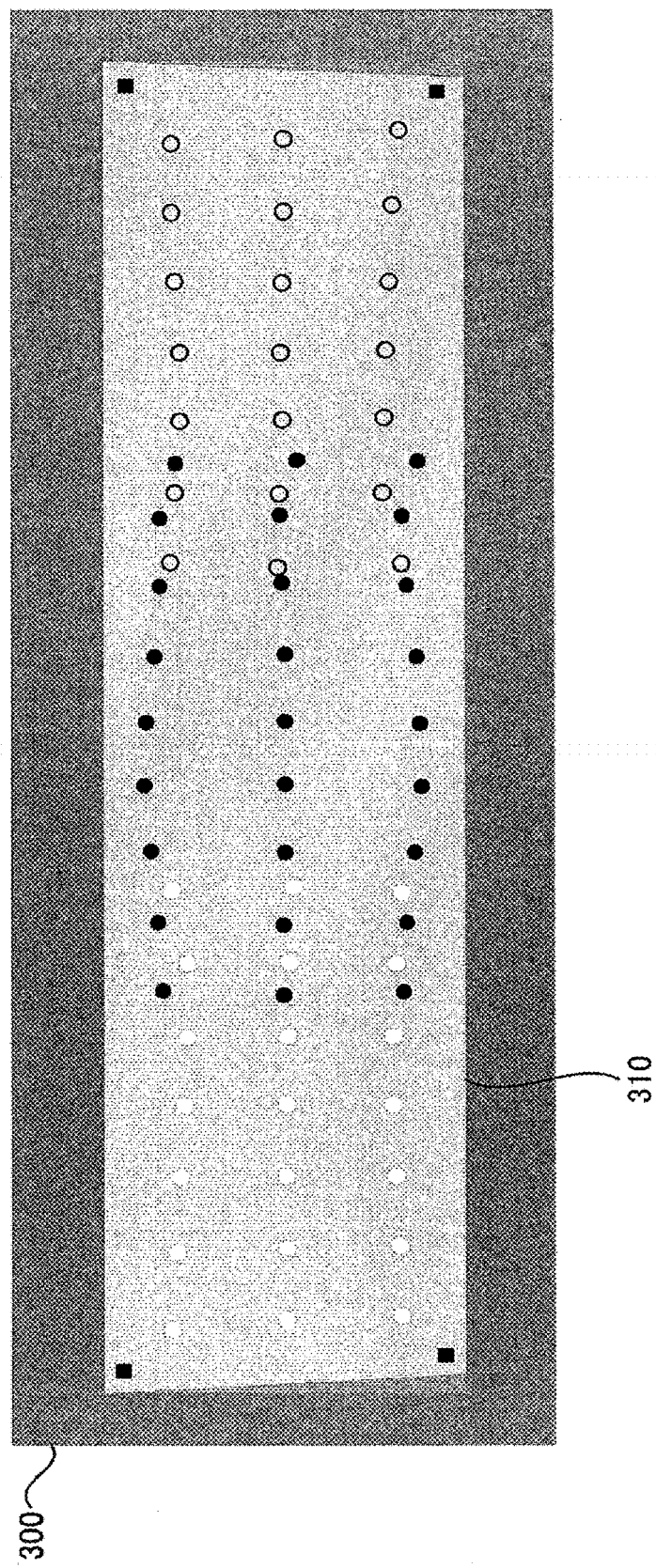
FIG. 7 is a drawing illustrating detection points of four-corner markers and groups of calibration points of the respective projectors 150 extracted on a coordinate system of captured images according to the embodiment.

FIG. 7 is a drawing illustrating the detection points of the four-corner markers and the groups of the calibration points of the respective projectors 150 extracted on the coordinate system of the captured images according to the embodiment. FIG. 7 shows the detection points of the four-corner markers (black quadrilaterals) and the calibration points (while circles, black circles, and outlined circles) of the three projectors 150 detected on the coordinate system 300 of the captured images. The gray area 310 on the coordinate system 300 of the captured images shown in FIG. 7 indicates an area corresponding to the screen 102 on the coordinate system 300 of the captured images. An object is to project the content image such that the projected content image can fit in the area 310 to be just the right size. It should be noted that because the camera 160 captures the images while being fixed in the described embodiment, the acquired coordinates of the calibration points and the coordinates of the detection points of the four-corner markers can be expressed by a single coordinate system.

In step S104, starting from the coordinates of the detection points of the four-corner markers calculated as described above, the projected area detection unit 130 detects positional coordinates of the respective reference points of the four corners that characterize the projected area of the screen 102 from the one or more calibration captured images.

Figure 8:
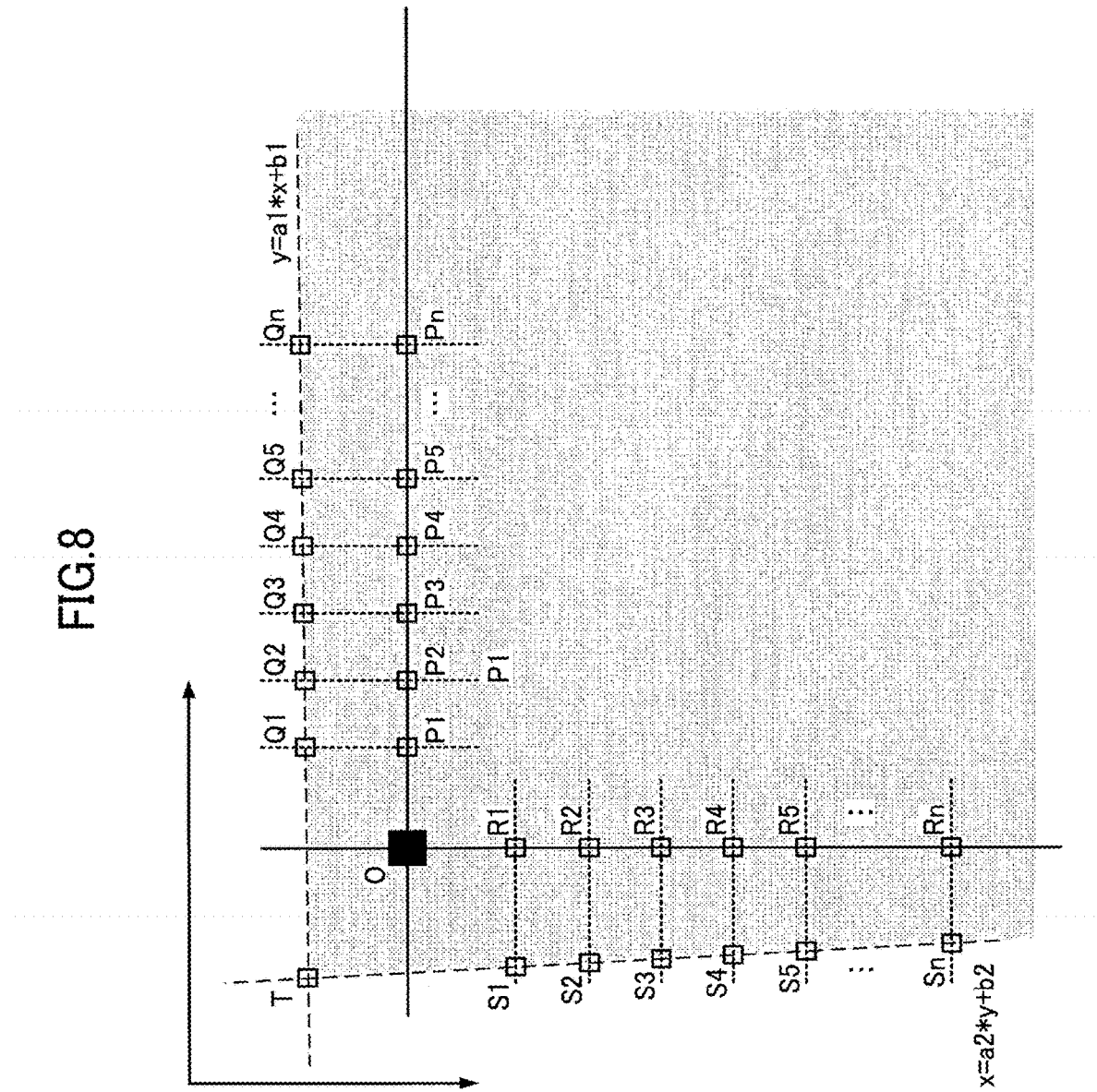
FIG. 8 is a drawing that depicts an algorithm for detecting reference points of a projected area executed by a projected area detection unit according to the embodiment.

FIG. 8 is a drawing that depicts an algorithm for detecting the reference points of the projected area executed by the projected area detection unit 130 according to the embodiment. In FIG. 8, the top left part of the projected area of the screen 102 in the calibration captured image, in which the top left corner of the four-corner markers is captured, is enlarged and shown. It should be noted that although FIG. 8 only shows one corner among the four corners of the screen 102, the other three corners may be similarly shown by rotating the vertical and horizontal directions by 90 degrees, 180 degrees, and 270 degrees. Further, for the calibration captured image used for detection, the first time captured image shown in FIG. 6 can be used for the top left corner and the bottom left corner, and the third time captured image shown in FIG. 6 can be used for the top right corner and the bottom right corner.

Here, the center position of the extracted four-corner marker is denoted as a point O $(x0, y0)$, and an indication of the size (for example, one side of a circumscribed rectangle of the four-corner marker) is denoted as L (pixel). Further, a point apart from the point O by "d" pixels to the right is denoted as a point P1 $(x0+d, y0)$, and a point apart from the point O by $(d+a)$ pixels to the right is denoted as a point P2 $(x0+d+a, y0)$. Similarly, a point apart from the point O by $(d+a(n-1))$ pixels is denoted as a point Pn $(x0+d+a(n-1), y0)$. "d" is selected such that the point P1 is positioned outside of the area occupied by the four-corner marker. For example, "d" may be L×2. For example, "a" may be 1. Here, "n" is a sufficient number for performing straight line estimation which will be described later. For example, "n" may be L×3.

For each Pi (i=1 through n), scanning is performed sequentially one pixel by one pixel to the upward direction (to one pixel above from Pi, to two pixels above, . . . , to m pixels above) in the calibration captured image. "m" is decided such that an upper side of the screen 102 is included within the scanned area in consideration of a possibility that some of the four-corner marker is projected toward inside from the upper side of the screen 102. For example, "m" may be L×5. During scanning, to a target pixel (x,y), edge detection filter processing is performed. As the edge detection filter, for example, a Sobel filter may be used. The Sobel filter is a filter for calculating first space derivation and detecting a contour. In a case in which a vertical edge is to be detected, a pixel value (luminance level) in the target pixel (x,y) is denoted as V (x,y), and a vertical gradient F expressed by a following formula (1) is calculated.

$$F = 2 \times (V(x, y-1) - V(x, y+1)) + (V(x-1, y-1) - V(x-1, y+1)) + (V(x+1, y-1) - V(x+1, y+1)) \qquad \text{FORMULA (1)}$$

When a value of the vertical gradient F becomes equal to or greater than a predetermined threshold Th and becomes the maximum value with respect to the scanning direction, scanning is stopped and the stopped point is denoted as a screen upper side pixel Qi. In a case in which the background is white, the screen is a gray mat, and it is limited to a change from black to white, a stop condition that the vertical gradient F is equal to or greater than the predetermined threshold Th can be used. In a case in which, for example, the background is black, the screen is a white or gray mat, and a change from white to black is included in the condition, the stop condition that the vertical gradient |F| is equal to or greater than the predetermined threshold Th can be used. It should be noted that, for simplifying the calculation, the calibration captured image can be converted into a gray scale (gray scale image) in advance.

By doing this, for the points P1 through Pn in the horizontal direction, a line of pixels Q1 through Qn that detect the upper side of the screen 102 is acquired. The straight line estimation is performed for these pixels Q1 through Qn using a least squares method, a linear expression "y=a1×x+b1" that approximates the upper side of the screen 102 is calculated.

Further, a point apart from the point O by "d" pixels to the downward direction is denoted as a point R1, a point apart from the point O by (d+a) pixels to the downward direction is denoted as a point R2, . . . , and a point apart from the point O by (d+a(n−1)) pixels is denoted as a point Rn. For each Ri (i=1 through n), scan is performed sequentially one pixel by one pixel to the left (to one pixel left from Ri, to two pixels left, . . . , to m pixels left) in the calibration captured image, and a horizontal gradient G of the Sobel filter is calculated. The horizontal gradient G can be calculated using a following formula (2).

$$G=2\times(V(x-1,y)-V(x+1,y))+(V(x-1,y-1)-V(x+1,y-1))+(V(x-1,y+1)-V(x+1,y+1)) \quad \text{FORMULA (2)}$$

When a value of the horizontal gradient G becomes equal to or greater than a predetermined threshold Th and becomes the maximum value with respect to the scanning direction, scanning is stopped and the stopped point is denoted as a screen left side pixel Si. By doing this, for the points R1 through Rn in the vertical direction, a line of screen left side pixels S1 through Sn is acquired. The straight line estimation is performed for these pixels S1 through Sn using a least squares method, a linear expression "x=a2×y+b2" that approximates the left side of the screen 102 is acquired. Because it is considered that this straight line is vertical or almost vertical, it is preferable to express it in "x=f(y)" fashion.

Then, an intersection point of the two approximation straight lines ("y=a1×x+b1" and "x=a2×y+b2") that are acquired as described above is calculated (detected) as the reference point $T_{LT}$ of the top left corner of the screen 102. The coordinates of the intersection point $T_{LT}$ are expressed by a following formula (3).

$$\left(\left(\frac{b1\times a2+b2}{1-a1\times a2}\right),\left(\frac{a1\times b2+b1}{1-a1\times a2}\right)\right) \quad \text{FORMULA (3)}$$

It should be noted that in the described embodiment, the projectors 150 are arranged such that respective projection images of the four-corner markers are projected in the vicinity of the four corners of the inside of the screen 102, and the camera 160 is fixed with the tripod stand or fixedly suspended from the ceiling such that the entirety of the four-corner markers and the screen 102 can be captured (included) within the angle of view of the camera 160. However, in the first time setting, a camera in hand may be used as the camera 160 and divisional imaging (capturing) may be performed such that a predetermined corner of the screen 102 and the four-corner marker are captured at the same time for each of the four corners. Even in such a case, panoramic composition in an image step is not required.

Referring back to FIG. 5, in step S105, the projected area detection unit 130 determines whether all of the reference points of the four corners that characterize the projected area of the screen 102 are successfully detected. In a case in which the projected area detection unit 130 determines that detection of at least one of the four corners has failed (NO in step S105), the process goes to step S106. In step S106, for the insufficient undetected reference point(s), the projected area detection unit 130 uses the detection positions of the four-corner markers as default values and receives position adjustment from the user as appropriate. At this time, the user can indicate coordinates points on the calibration captured images via the input device 170 by moving the mouse or the cursor. In this way, the coordinates of the reference points can be designated.

On the other hand, in a case in which the projected area detection unit 130 determines that the all of the four corners are detected successfully (YES in step S107), the process goes to step S107 directly. In step S107, although details will be described below, the geometric correction coefficients for the respective projectors 150 are calculated based on the calculated calibration point coordinates and the reference points of the projected area described above. In step S108, the image processing apparatus 110 calculates the blending coefficients for the respective projectors 150. In step S109, the image processing apparatus 110 sets, in the respective correction processing units 114, the geometric correction coefficients for the respective projectors 150 calculated in step S107 and the blending coefficients for the respective projectors 150 calculated in step S108.

In step S110, the image processing apparatus 110 reads the content image to be projected. In step S111, the correction processing units 114a through 114c corresponding to the projectors 150a through 150c execute the calibration process on the content image. In step S112, the image processing apparatus 110 causes the projection image output units 116a through 116c, which correspond to the respective projectors 150, to output the respective corrected projection images. Then, the process goes to a normal projection mode in step S113. In this way, it becomes possible to project the content image as a whole (whole content image) in the screen 102. After that, manual and fine adjustment may be performed as appropriate while projecting the content image in the screen 102.

(Calculation of Geometric Correction Coefficients)

Figure 9:
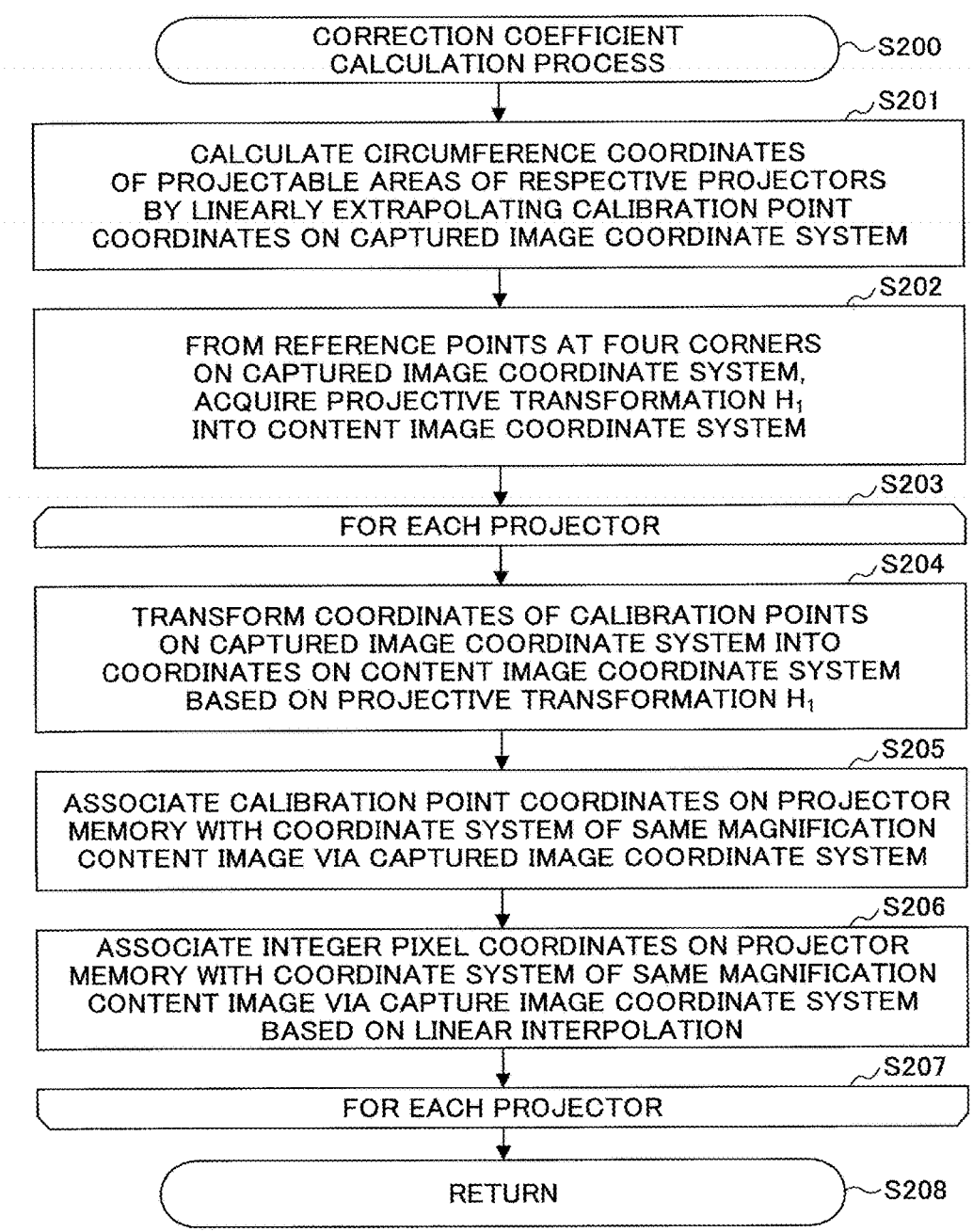
FIG. 9 is a flowchart illustrating a calculation process of calculating geometric correction coefficients executed by a correction coefficient calculation unit according to the embodiment.

In the following, details of a calculation process of calculating geometric correction coefficients of the projectors 150a through 150c will be described with reference to FIGS. 9 through 12 and 14A. FIG. 9 is a flowchart illustrating the calculation process of calculating geometric correction coefficients executed by the correction coefficient calculation unit 132 according to the embodiment. The process shown in FIG. 9 is called in step S107 shown in FIG. 5 and starts from step S200.

In step S201, the correction coefficient calculation unit 132 calculates circumference coordinates of the projectable areas of the respective projectors 150a through 150c by linearly extrapolating the calibration point coordinates on the coordinate system of the captured images for the respective projectors 150a through 150c.

Figure 10B:
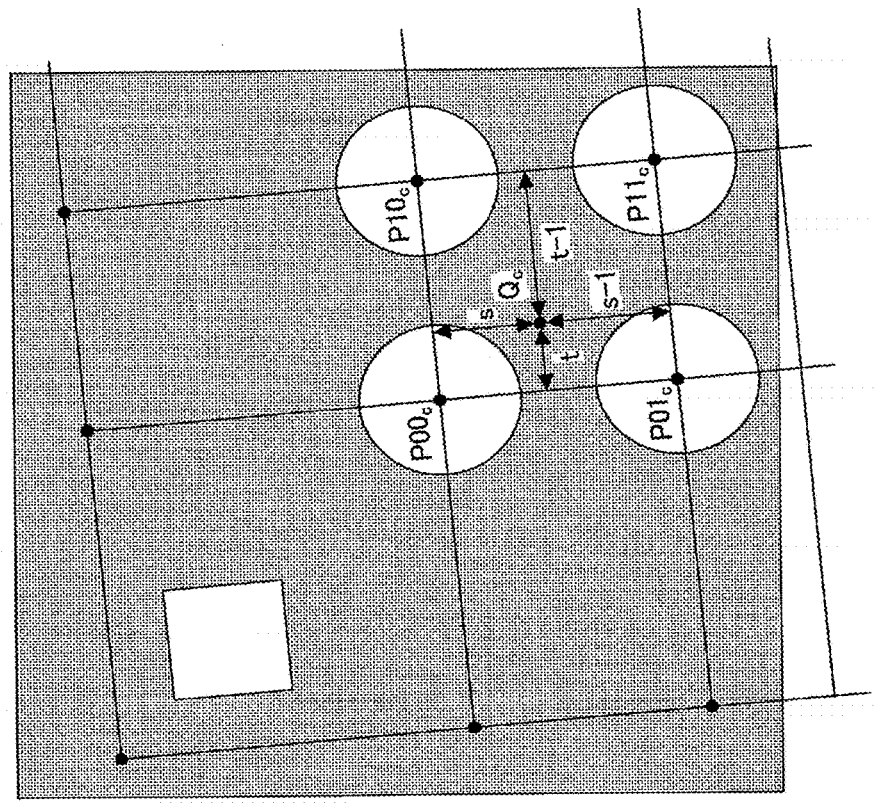
FIGS. 10A and 10B are drawings illustrating a calculation method of calculating circumference coordinates of projectable areas based on linear extrapolation using respective calibration point coordinates.
Figure 10A:
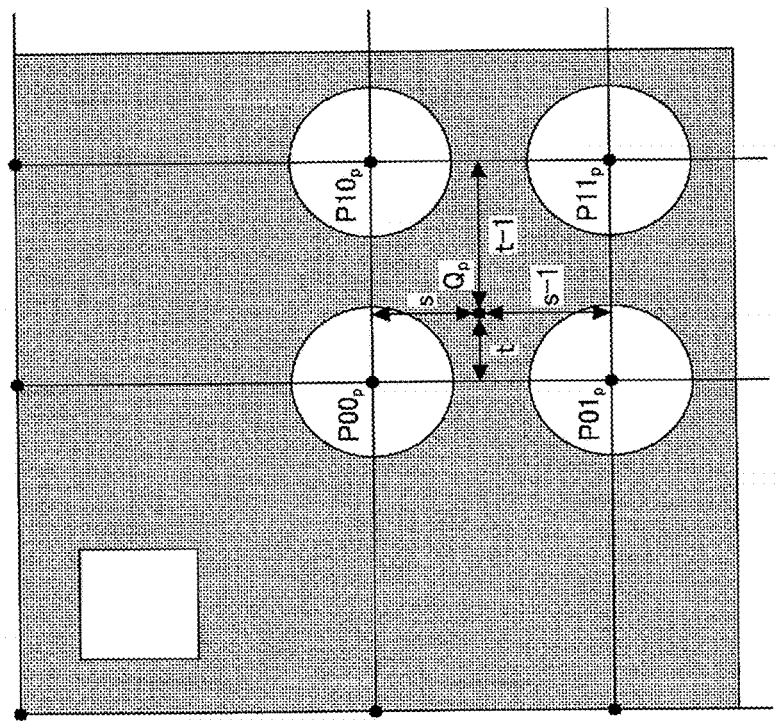

FIGS. 10A and 10B are drawings illustrating a calculation method of calculating the circumference coordinates of the projectable areas based on the linear extrapolation using the respective calibration point coordinates. FIG. 10A shows four calibration points at the top left corner on the projector memory, and FIG. 10B shows corresponding four calibration points on the coordinate system of the captured images. As shown in FIG. 10A, the circumference coordinates on the projector memory (the calibration points on the four corners and on the four sides of the projection images of the projectors 150) are fixed at the positions which extrapolate a quadrilateral patch of the four calibration points disposed in a circumference part (e.g., $P00_P$ through $P11_P$) (the positions corresponding to, for example, 1.5 times the distance between calibration points).

As shown in FIG. 10B, the coordinates of the circumference pixels (calibrations points on the four corners and on the four sides) corresponding to the projectable areas of the projectors 150 in the coordinate system of the captured images can be calculated by linearly extrapolating from the corresponding four calibration point coordinates disposed in the circumference part. Similarly, points on the coordinate system corresponding to arbitrary coordinate points on the projector memory other than the circumference coordinates (calibration points on the four corners and on the four sides) can be acquired by linearly interpolating or extrapolating the nearby four calibration point coordinates.

In the whole image, non-linear geometric distortion may be produced. However, in this case, it is assumed that the distortion is a linear geometric distortion in parts of the image including the range of the quadrilateral patch having 2×2 calibration points and the range determined by extrapolating toward the circumference by a predetermined amount. This is because the size of the above quadrilateral patch can be deemed as being sufficiently small.

By performing the linear extrapolation described above for the respective projectors 150a through 150c, it becomes possible to detect the projectable areas (that is, the area in which a whole white image can be projected) of the three projectors 150a through 150c on the coordinate system of the captured images. FIG. 11 is a drawing that depicts mapping the projectable areas 304a through 304c of the three projectors 150a through 150c on the coordinate system of the captured images, the projection target area 310 and a content image. FIG. 11 shows the projectable areas 304a, 304b, and 304c of the projectors 150a, 150b, and 150c detected on the coordinate system 300 of the captured image. The projectable area 304a of the first projector 150a is illustrated by a solid white line, the projectable area 304b of the second projector 150b is illustrated by a dashed white line, and the projectable area 304c of the third projector 150c is illustrated by a two-dot chain white line. Here, it is required that the area 310 of the screen 102, to which the projection images are desired to fit in just the right size, is fully filled with an area of a logical addition (OR) of the projectable areas of the three projectors 150.

Further, in FIG. 11, the reference points ($T_{LT}$, $T_{LB}$, $T_{RT}$, $T_{RB}$) of the four corners on the coordinate system of the captured images and straight lines (approximate to two sides) that define the corners are shown. In the described embodiment, a goal is to project the content image on the projection target area 310 that is a quadrilateral (not necessarily a rectangle on the captured image) defined by the detected reference points.

Referring back to FIG. 9, in step S202, the projective transformation is acquired in order to map the rectangular content image into the projection target area 310 shown in FIG. 11. The projection target area 310 is defined by reference point coordinates of the four corners of the screen 102. Here, the symbol "$H_1$" denotes the projective transformation from the projection target area 310 into the content image. The correction coefficient calculation unit 132 calculates the coefficients of the projective transformation "$H_1$" from the projection target area 310 into the content image based on the reference point coordinates ($T_{LT}$, $T_{LB}$, $T_{RB}$, $T_{RT}$) defining the projection target area 310 and the coordinates of the four corners of the content image.

The transformation formula of the projective transformation "$H_1$" is given by the following formulas (4). By multiplying both sides by the denominators and arranging the formulas, the formulas (5) which are developed to fit a first-order polynomial are obtained.

$$u = \frac{x*a + y*b + c}{x*g + y*h + 1}$$ FORMULA (4)

$$v = \frac{x*d + y*e + f}{x*g + y*h + 1}$$

$$u = x*a + y*b + c - x*g*u - y*h*u$$ FORMULA (5)

$$v = x*d + y*e + f - x*g*v - y*h*v$$

In the above formulas (4) and (5), the symbols "x" and "y" denote the coordinates on the coordinate system of the captured image before the transformation, and the symbols "u" and "v" denote coordinates on the coordinate system of the content image after the transformation. Further, the eight coefficients "a" through "h" denote the projective transformation coefficients. In the above formulas, in order to calculate eight projective transformation coefficients that are unknown parameters, it is necessary to have at least eight simultaneous equations. However, the eight simultaneous equations can be generated based on the correspondence relationships of the reference points and the coordinate points at the four corners in the content image. Therefore, it becomes possible to acquire the eight coefficients "a" through "h" by solving the generated eight simultaneous equations based on the correspondence relationships described above.

Referring back to FIG. 9, in a loop from step S203 to step S207, the processes in steps S204 to S206 are executed for the respective projectors 150, and the geometric correction coefficients are acquired for the respective projectors 150.

In step S204, the correction coefficient calculation unit 132 transforms the coordinates of the calibration points on the coordinate system of the captured images into the coordinate system of the content image based on the acquired projective transformation "$H_1$". In the following, the content image on the coordinate system of the captured images attached to the projection target area 310 is referred to as a "projected content image". The content image that is the original image of the "projected content image" is referred to as a "same magnification content image".

In step S205, the correction coefficient calculation unit 132 associates the calibration point coordinates on the projector memory with the pixel positions of the coordinate system of the same magnification content image via the coordinate system of the captured images. In step S206, the correction coefficient calculation unit 132 associates integer pixel coordinates on the projector memory with pixel positions of the coordinate system of the same magnification content image via the coordinate system of the captured images based on the linear interpolation.

Figure 12:
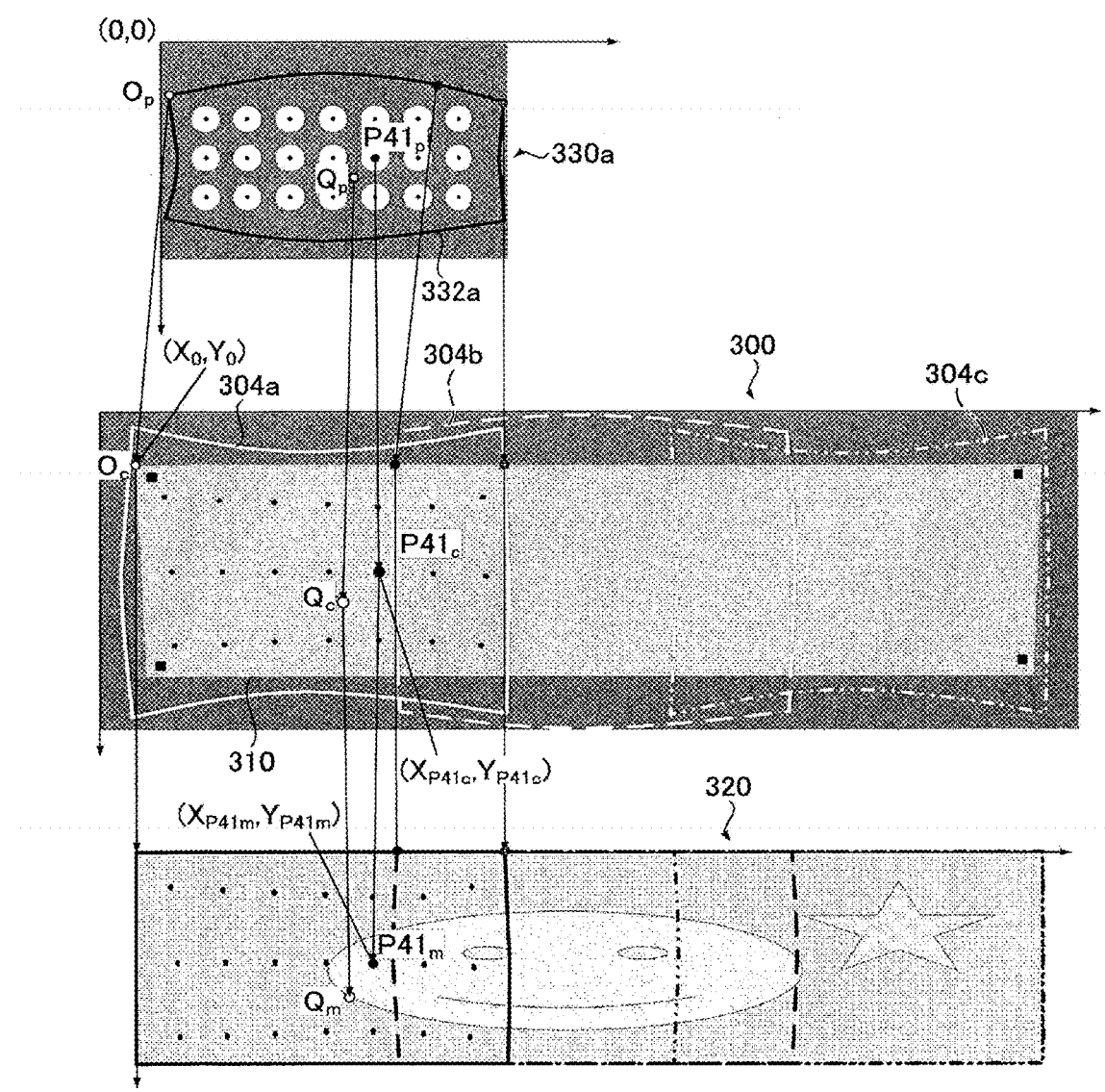
FIG. 12 is a drawing that depicts association of respective coordinates on a projector memory and pixel positions on a same magnification content image which corresponding to positions on the projection content image.

As shown in FIG. 12, the geometric correction coefficients, which are calculated in the processes in steps S204 through S206, associate the coordinates on the projector memory 330 with the pixel positions on the same magnification content image corresponding to the positions on the projected content image.

With reference to FIG. 12, an example is described based on one calibration point $P41_P$ on the projector memory 330a. Relative to the calibration point $P41_P$ on the projector memory 330a, a corresponding point $P41_c$ ($X_{P41c}$, $Y_{P41c}$) on the coordinate system 300 of the captured image is extracted. Then, because the quadrilateral projection target area 310 is mapped to the content image, as shown in FIG. 12, relative to a coordinate position $P41_c$ on the coordinate system 300 of the captured image, a pixel position $P41_m$ ($X_{P41m}$, $Y_{P41m}$) on the same magnification content image is further determined.

Specifically, when the coordinates of the origin at the left top of the projected content image mapped on the coordinate system of the captured images in FIG. 12 are given as ($X_0$, $Y_0$), the corresponding pixel position $P41_m$ ($X_{P41m}$, $Y_{P41m}$), on the same magnification content image, to be projected at this calibration point on the coordinate system of the captured images can be calculated from the coordinates $P41_c$ ($X_{P41c}$, $Y_{P41c}$) of the point $P41_c$ on the coordinate system 300 of the captured image by using the following formula (6).

$$(X_{P41m}, Y_{P41m}) = H_1(X_{P41c} - X_0, Y_{P41c} - Y_0) \quad \text{FORMULA (6)}$$

Similarly, as for all the calibration points $P_{ijp}$ other than the calibration point $P41_p$ on the projector memory, corresponding pixel positions on the same magnification content image can also be calculated. As for arbitrary coordinates other the calibration points on the projector memory, based on a method similar to the method described with reference to FIGS. 10A and 10B, the corresponding pixel positions on the same magnification content image can be calculated by performing linear interpolation (interpolation, or extrapolation for a circumference part) on the corresponding pixel positions on the content image of nearby 2×2 calibration points. In this way, the pixel positions of the area that the first projector 150a is in charge of in the content image are associated with the pixels of a predetermined area 332a on the projector memory 330a.

FIG. 14A is a table illustrating data structure of the geometric correction coefficients of one projector calculated in the process in steps S204 through S206. As shown in FIG. 14A, the corresponding pixels positions on the same magnification content image relative to all the pixels of the projector memory acquired as described above are geometric correction coefficients.

When the integer pixel coordinates on the projector memory are associated with the coordinate system of the same magnification content image for all the projectors in a loop of step S203 to step S207, the process goes to step S208. In step S208, this process ends and the process returns to the step from which this process is called shown in FIG. 5.

(Calculation of Blending Coefficient)

Figure 13:
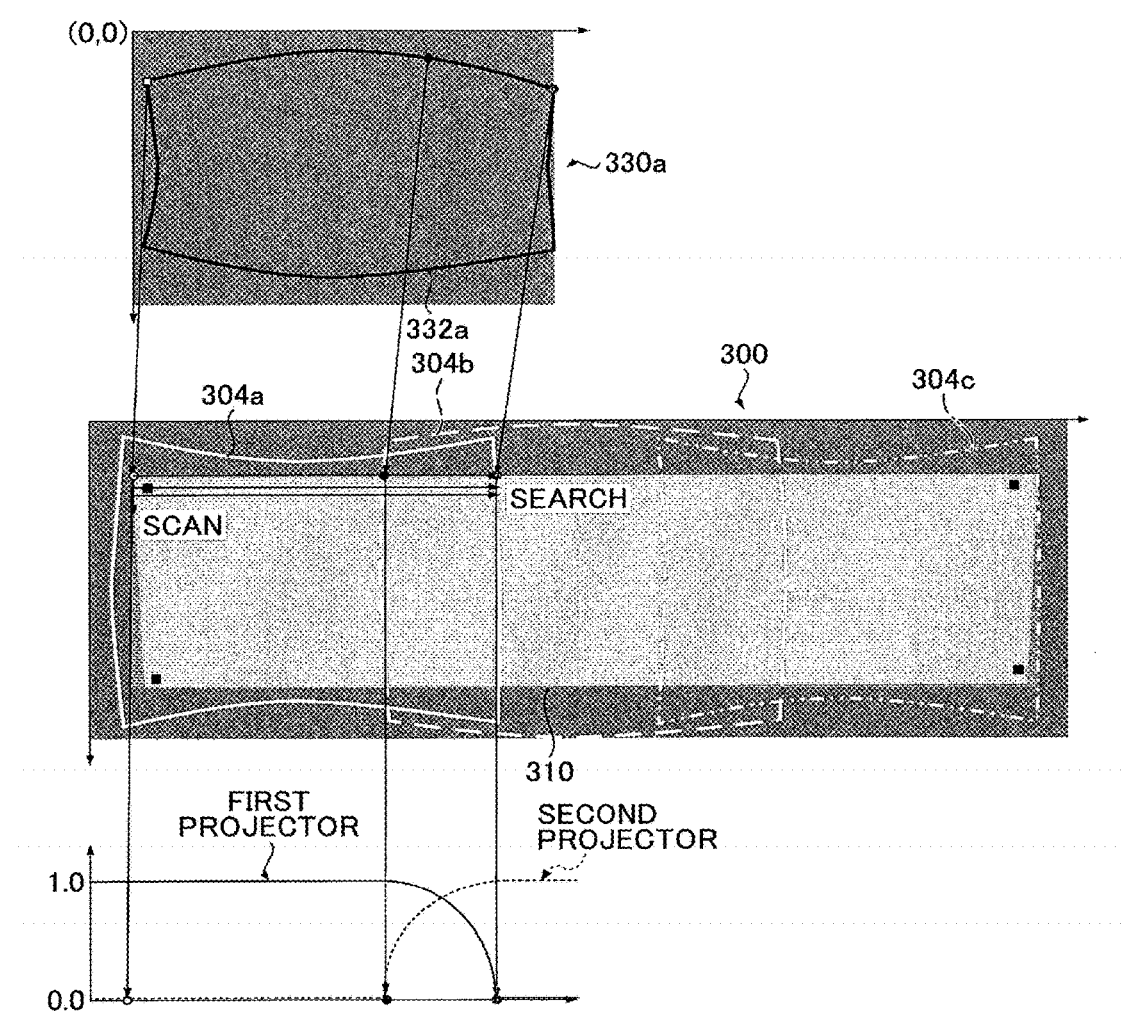
FIG. 13 is a drawing that depicts associations of blending coefficients and the respective coordinates on the projector memory.

In the following, details of a calculation process of calculating blending coefficients of the projectors 150a through 150c will be described with reference to FIGS. 13, 14A, and 14B. FIG. 13 is a drawing illustrating an association between the coordinates on the projector memory and the blending coefficients. In the process of calculating the blending coefficients, the process is executed for each of the projectors 150, to which attention is paid, to acquire the blending coefficients of the projectors 150a through 150c.

First, in the coordinate system 300 of the captured image, the correction coefficient calculation unit 132 detects an overlapped area of the projectable areas of the projectors adjacent to each other based on the circumference coordinates of the projectable areas of a target projector and another projector adjacent to the target projector. As shown in FIG. 13, from the top side of the projection target area 310 on the coordinate system 300 of the capture image, a search is performed from the left origin (○) in the direction to the right, and the search is gradually lowered. In this way, the start point (●) and the end point (◉) of the overlapped area between the first projector 150a and the second projector 150b are detected.

As shown in the bottom graph of FIG. 13, for the first projector 150a, as for the pixels in the range from the origin (○) to the start point (●) of the overlapped area, the blending coefficient is set to the maximum value (i.e., 1). On the other hand, as for the pixels in the range from the start point (●) to the end point (◉) of the overlapped area, the blending coefficient is calculated by applying the reverse correction to the input/output characteristics of the projector such that the actual brightness is gradually decreased from 1.0 to 0 based on the horizontal distance from the start point (●).

The correction coefficient calculation unit 132 associates the integer pixel coordinates on the projector memory with the blending coefficients allocated to the integer pixels nearest to the coordinates (decimal point) of the coordinate system of the captured images corresponded based on the data structure shown in FIG. 14A.

By the process described above, as shown in FIG. 14B, the blending coefficients of all the pixels of the projector memory for the corresponding projectors 150a through 150c can be acquired. It should be noted that, when the second projector 150b is the target projector, the blending coefficients of the two overlapped areas between the second projector 150b and the first projector 150a and between the second projector 150b and the third projector 150c are calculated.

(Correction Process)

In the following, details of the correction process based on the correction coefficients will be described with reference to FIGS. 14A, 14B, and 15. The geometric correction coefficients of the projectors 150 and the blending coefficients of the projectors 150 calculated by the correction coefficient calculation unit 132 are set in the respective correction processing units 114a through 114c in step S108 shown in FIG. 8.

First, the correction processing units 114 prepare correspondence data in which all the pixels of the projector memory are associated with the corresponding pixel positions on the same magnification content image. Because the pixel positions relative to all the pixels of the projector memory as shown in FIG. 14A are already acquired by the process performed by the correction coefficient calculation unit 132, the correction processing units 114 directly read the correspondence data.

The correction processing units 114 generate intermediate images from the same magnification content image, which is to be projected, based on the pixel positions (decimal point) on the same magnification content image is to be referred to for each pixel on the projector memory by using a pixel interpolation method such as bi-linear and bi-cubic interpolation. The intermediate images are images in which the geometric distortions detected in the content image are reversely deformed based on the geometric correction coefficients. The correction processing units 114 generate final projection images by multiplying pixel values for each of colors R, G, and B of the generated intermediate images by the blending coefficients corresponded based on the correspondence data in FIG. 14B.

Figure 15:
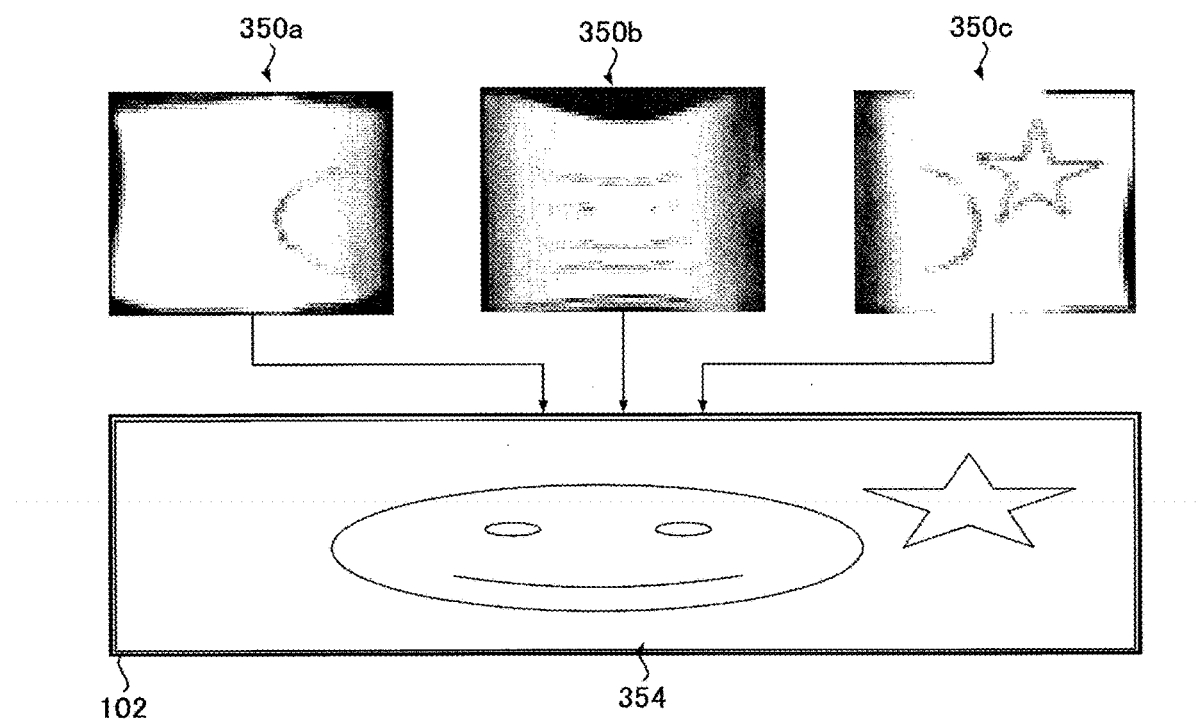
FIG. 15 is a drawing that depicts a correction process executed by correction processing units according to the embodiment based on the correction coefficients.

FIG. 15 is a drawing that depicts the correction process based on the correction coefficients described above. FIG. 15 shows projection images 350a through 350c that are finally acquired from the content image by the correction processing units 114a through 114 for the three projectors 150a through 150c. As shown in FIG. 15, during the projection mode, those projection images 350a through 350c are projected from the respective projectors 150a through 150c. The projection images 350a through 350c are appropriately overlapped on the screen 102 to be combined into a single projection image 354 such that the single projection image 354 just fit into the outer edge of the screen 102.

(Recalibration Process and Maintenance Notice after Initial Calibration)

As described above, the process flow shown in FIG. 5 is executed when the projectors 150 are installed the first time or when arrangement of the projectors 150 is changed. In the following, with reference to FIGS. 16 and 17A and 17B, a recalibration process flow will be described that is executed after the initial calibration is performed or after the arrangement of the projectors 150 is changed.

In a case in which the above described projection system 100 is used as permanent signage, it is inevitable that the projectors 150 become misaligned due to passage of time and/or vibration after arrangement of the projection system 100 has been aligned (adjusted) once. As a result, a deviation may occur at a connection part of the projection images, and a state may continue in which image quality is extremely degraded. Thus, in the related technique, it is required that a manager goes to the site to check a deviation. Then, in a case in which the deviation is recognized, it is required that a serviceman or a maintainer having skill in maintenance is called every time. Further, work for the recalibration using the camera 160 and the tripod stand is required.

Thus, the described embodiment provides, in the maintenance after the first time calibration, a recalibration function for easily aligning (adjusting) a minute deviation in a connection portion of the connected projection images caused by a minute positional deviation between the plurality of projectors 150 due to the vibration or the like. Even if a deviation in the connection portion of the connected projection images is minute (for example, several pixels), a character may be doubled in an overlapped portion and image quality may be extremely degraded. Specifically, when short focus projectors are used, it becomes prominent.

The process shown in FIG. 16 is started by the recalibration control unit 134 from step S300 in response to an event. It should be noted that, in the recalibration process, calibration is executed while the camera 160 is permanently fixed (for example, suspended from the ceiling as shown in FIG. 2A) and the boundaries between the screen 102 and the background are clearly indicated.

In step S301, similar to the previous time, the image processing apparatus 110 causes the projectors 150a through 150c to project the respective calibration projection scenes, and acquires the calibration captured images using the camera 160. In step S302, the image processing apparatus 110 executes the characteristic point extraction process. In step S303, starting from the extracted coordinates of the detection points of the four-corner markers, the projected area detection unit 130 detects positional coordinates of the reference points that characterize the four corners of the screen 102 from the calibration captured images. That is, in the recalibration, an algorithm for detecting the reference points similar to the first time calibration is executed. In step S304, the projected area detection unit 130 determines whether the reference points of all of the four corners of the screen 102 are successfully detected. In a case in which the projected area detection unit 130 determines that detection of at least one of the four corners fails (NO in step S304), the process goes to step S305.

In step S305, for the insufficient undetected reference points, the projected area detection unit 130 uses the reference points that are stored in the reference point storage unit 136 and that have been adjusted manually or detected automatically when the previous time calibration has been performed (first time calibration is performed, or the latest recalibration is performed in a case in which the recalibration is performed after the first time calibration). In other words, in a case in which at least one of the reference points is not detected, the projected area detection unit 130 can use when executing the recalibration, the reference points stored in the reference point storage unit 136 for the at least one of the reference points that are undetected.

In a case in which the coordinates of the reference points acquired when the previous time recalibration has been executed are used, when the camera 160 is misaligned simultaneously, a deviation may occur in accordance with the misalignment of the camera 160. However, the short focus projectors are extremely sensitive to a positional deviation because the short focus projectors project at an extremely wide angle from a position close to the screen 102. On the other hand, it is considered that a deviation in the camera 160, which captures images from a remote position and which is relatively light, is relatively minute. That is, it can be considered that directly treating the coordinate positions of the reference points of the previous time on the coordinate system of the captured images in the recalibration, while assuming that imaging deviation based on the positional deviation of the camera is unlikely to occur and the coordinate systems of the captured images are matched approximately, is closer to the correct answer than using the coordinates of the detection points of the four-corner markers. Also, in this case, even if manual and fine adjustment is required after the recalibration, labor for the fine adjustment can be reduced.

On the other hand, in a case in which the projected area detection unit 130 determines that the all of the four corners are detected successfully (YES in step S304), the process goes to step S306 directly. In step S306, calculation of the geometric correction coefficients shown in FIG. 9 is executed. In step S307, the image processing apparatus 110 calculates the blending coefficients for the respective projectors 150a through 150c.

In step S308, the recalibration control unit 134 determines whether a calibration error occurs in the recalibration process. In a case in which the recalibration control unit 134 determines that the calibration error does not occur and the recalibration can be executed successfully (NO in step S308), the process goes to step S309. After that, a process in step S309 to S312 is similar to the process in step S109 to S112, and the process goes to a normal projection mode in step S313.

On the other hand, in a case in which the recalibration control unit 134 determines that the calibration error occurs (YES in step S308), the process goes to step S314. For example, in a case in which a large deviation, having a degree of precluding application of the recalibration process, occurs between the projection images, or a disturbance or a malfunction occurs in the projectors 150 and the camera 160, the recalibration control unit 134 determines that the calibration error occurs because projection and capturing (imaging) cannot be performed normally.

Figure 17A:
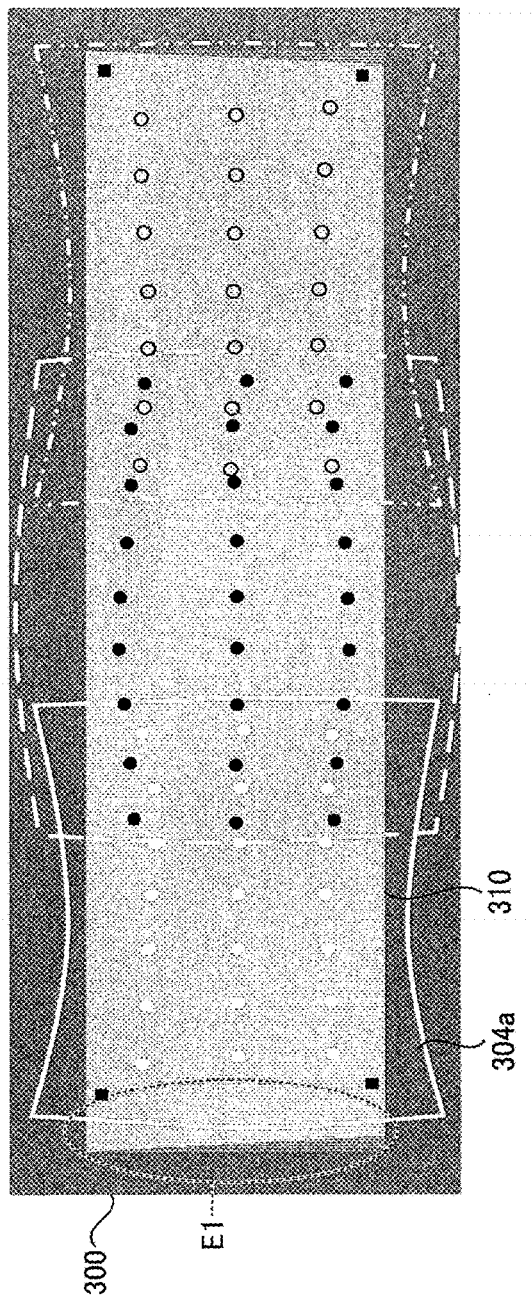
FIGS. 17A and 17B are drawings illustrating specific examples in which a calibration error occurs in the recalibration process according to the embodiment.
Figure 17B:
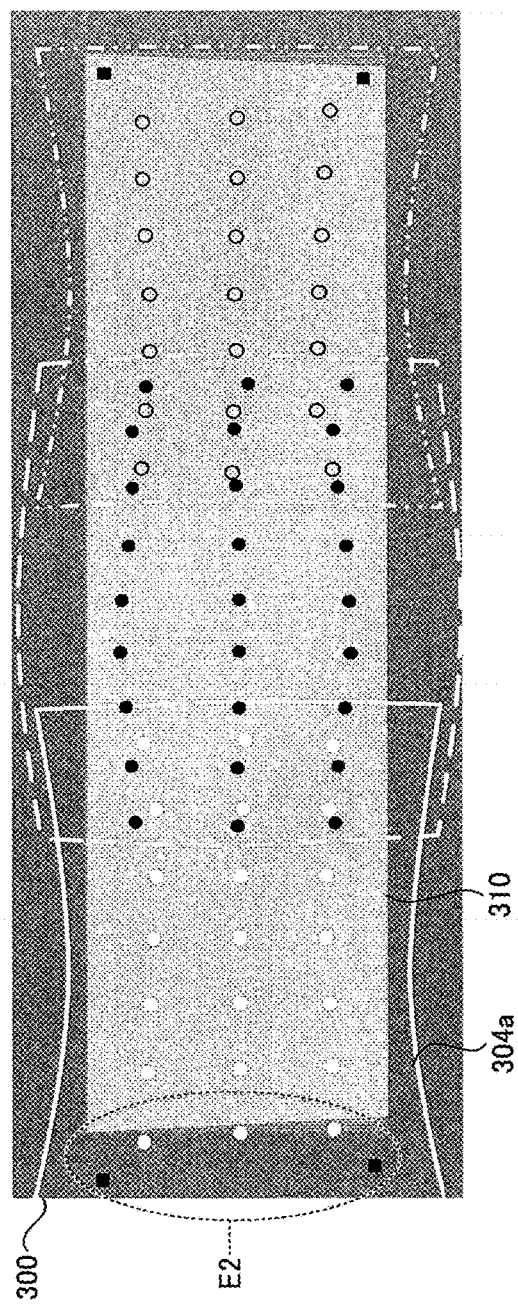

FIGS. 17A and 17B are drawings illustrating specific examples in which the calibration error occurs in the recalibration process according to the embodiment. In a specific example shown in FIG. 17A, a case (E1) is shown in which the projectable area 304a cannot satisfies the projected area (target projection area) 310. Because the projectable area 304a is calculated in the geometric correction process described above, the error can be detected by comparing with the projected area 310 defined by the detected reference points. In a specific example shown in FIG. 17B, a case (E2) is shown in which the four-corner markers and the calibration patterns deviate from the projected area 310 and cannot be recognized, and sufficient precision cannot be obtained.

In the above described cases, the calibration patterns cannot be recognized and the calibration error occurs, or even if the calibration patterns are recognized, because the projection target area protrudes to the outside of the projectable area in the calculation of the correction coefficients for the target projection area, an error occurs in the calculation of the correction coefficients. In the examples shown in FIGS. 17A and 17B, it is required that the maintainer goes to the site to adjust positions of the projectors 150 physically and/or to adjust positions of the projection images optically.

Further, in a case in which a crucial malfunction occurs in the projectors 150 such as running out of a lamp and a stop due to an error caused by a temperature increase, or a crucial malfunction occurs in the camera 160 such as a breakdown and a disturbance such as noise in an imaging system, the calibration error may occur. In any case, there is a high likelihood that maintenance by a person is required.

Thus, in step S314, the maintenance notification unit 138 transmits, to the preset contact addresses, the notice for requesting the maintenance by a person. Then, the process goes to an error mode in step S315.

In the notice for requesting the maintenance described above, the following information can be attached and reported such that the maintainer recognizes whether occurrence of a large deviation is a reason or occurrence of a malfunction in the projectors 150 and/or the camera 160 is a reason.

In a specific embodiment, the information may include at least one of (1) a captured image in which projection status of the projectors 150 is captured before executing the recalibration in which the error occurs, (2) one or more captured images for calibration captured when executing the recalibration, (3) an intermediate result (such as coordinates of the acquired reference points, the calibration points, and the detection points of the four-corner markers) of pattern recognition from the one or more captured images for calibration, and (4) a captured image in which projection status of the projectors 150 is captured after the re-execution (that is, error status, imperfect calibration status, status with no correction).

By attaching the above described information to the maintenance notice, the maintainer who receives the notice can recognize, before going to the site and performing the maintenance, the site situation (around the projection system 100) about whether the error is caused not by a positional deviation but caused by, for example, running out of a lamp or a disturbance to a camera captured image such as light incidence from the outside or the error is caused by a positional deviation. Then, the maintainer can be prompted to go to the site for returning the projection system 100 to the projection status in which the recalibration can be executed by moving physical positions of the projectors 150 or by using an optical unit (lens shift function) in accordance with the situation.

As an example, captured images acquired by capturing projection images, in which calibration images as shown in FIG. 6 are inverted such that black patterns are formed on a white background, projected from all of the projectors 150a through 150c in a state before the recalibration can be transmitted. In this way, the maintainer can recognize projectable areas of the respective projectors 150, calibration patterns, relative positional relationships with the screen 102 and operational statuses of the respective projectors 150 (for example, whether the projector 150 is operating normally, or a lamp runs out).

Because a user has only to instruct (request) the recalibration and the above described recalibration process is executed automatically, even a general user, who is not familiar with performing the recalibration, can easily perform the recalibration and the correction. At that time, the general user does not have to set the camera 160 on the tripod stand and does not have to use a camera in hand. Further, the general user does not have to adjust manually and finely the projection status to the screen 102. Further, because the above described recalibration process can be started at fixed intervals such as each predetermined period, a minute deviation can be corrected again at fixed intervals. Even if a person does not monitor the projection status and/or the projection system 100 regularly or continuously, the minute deviation can be corrected automatically.

Further, in a case in which the calibration error occurs when executing the recalibration process, information that indicates that there is a high likelihood that a situation occurs in which the maintenance by a person is required can be reported to the manager and the maintainer. Further, the manager and the maintainer can recognize in advance the situation including whether the reason that the recalibration cannot be executed is a large positional deviation of the projectors 150 or is another malfunction (for example, running out of a lamp, breakdown of the capturing camera, or generation of noise such as light from the outside when capturing images).

(Modified Example of Projecting and Capturing the Calibration Projection Scene)

Further, in the above described embodiment, the camera 160 is fixed to capture the projection images the plurality of times such that the whole of the projection images 212, 214, and 216 of all the connected projectors 150a, 150b, and 150c, can be fit within the angle of view of the camera 160. However, in the first time calibration, the camera 160 may be set such that only a part of the whole of the projection images can be captured within the angle of view of the camera 160, and the projection images may be captured a plurality of times while changing the imaging range ("divisional imaging").

Figure 18:
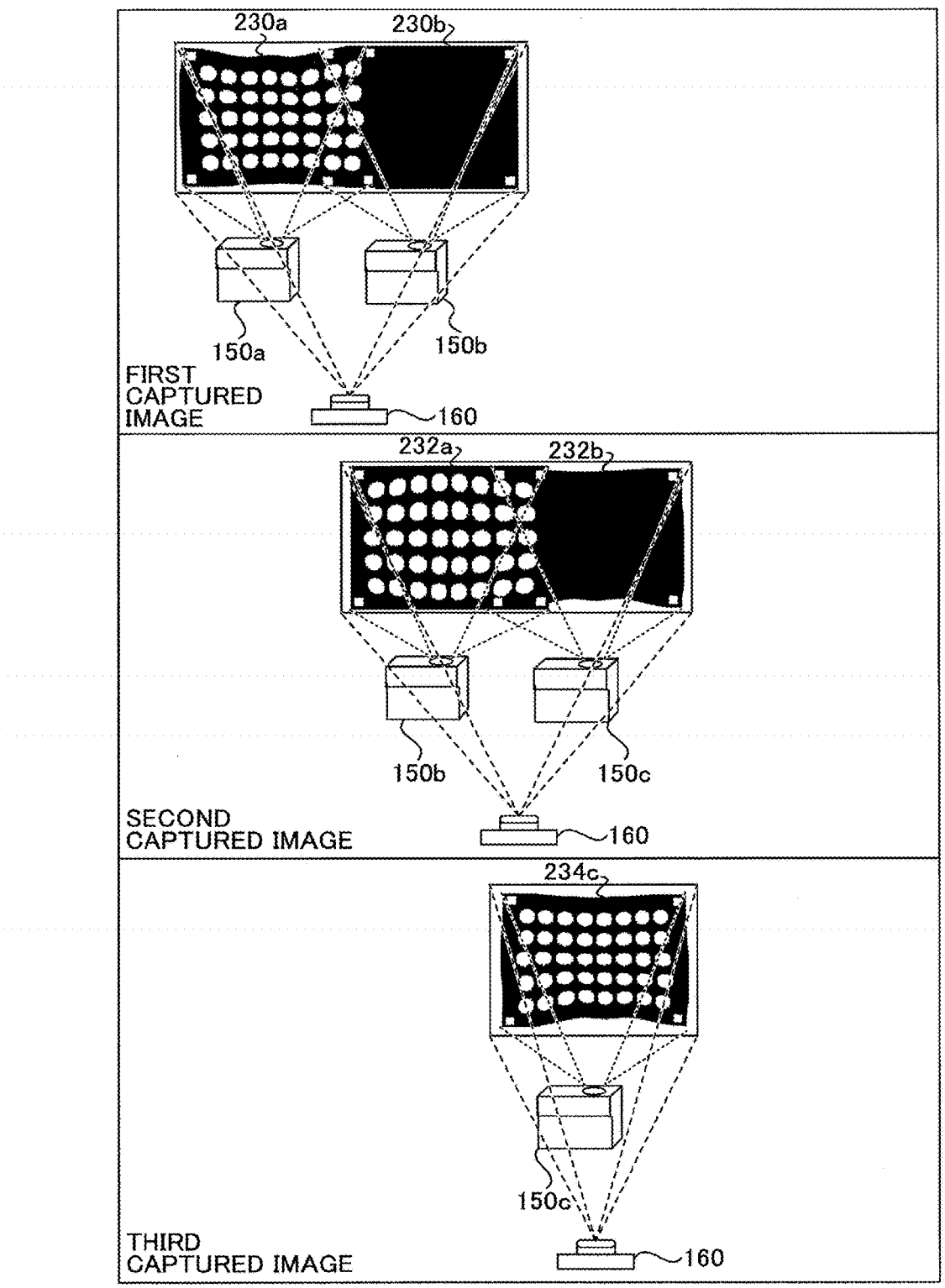
FIG. 18 is a drawing illustrating examples of correction projection scenes projected from the projectors according to another embodiment.

For example, as shown in FIG. 18, in another embodiment, positioning markers indicating the four corners of the projection images are formed in the calibration images. Then, the camera 160 may be set such that only the calibration images 230 and 232 corresponding to two projectors 150a and 150b adjacent to each other can be captured within the angle of view of the camera 160 and may capture the calibration images 230 and 232. Then, the calibration captured images are acquired separately in a plurality of times while moving the camera 160. In this case, the positioning markers formed on the calibration images corresponding to the left and right ends of the projector 150 may also be used as the four-corner markers described above. In this case, the first time calibration captured image can be used for the top left corner and the bottom left corner and the third time calibration captured image can be used for the top right corner and the bottom right corner.

In this case, it becomes possible to integrate the characteristic points extracted from the calibration captured images into the integrated coordinate system based on the projective transformation by using detection positions of positioning markers commonly included (captured) among the plurality of calibration captured images. The characteristic point extraction unit 128 can acquire the coefficients of the projective transformation based on the relationships of the coordinate positions of the positioning markers, and calculate the coordinates of the calibration points on the integrated coordinate system that is integrated by performing the projective transformation between the coordinate systems of the plurality of calibration captured images.

(Hardware Configuration)

In the following, a hardware configuration of the image processing apparatus 110 according to the above described embodiment will be described with reference to FIG. 19. Typically, as the image processing apparatus 110, a general-purpose computer apparatus may be used. FIG. 19 is a block diagram illustrating a hardware configuration of a general-purpose computer apparatus according to the embodiment.

As shown in FIG. 19, a general-purpose computer apparatus (image processing apparatus) 110 includes a Central Processing Unit (CPU) 12, a north bridge 14 that handles the connection between the CPU and a memory, and a south bridge 16. The south bridge 16 is connected to the north bridge 14 via a dedicated bus or a Peripheral Component Interconnect (PCI) bus, and handles the connections with I/O such as the PCI bus and a Universal Serial Bus (USB).

The north bridge 14 is connected to a Random Access Memory (RAM) 18, which provides a work area for the CPU 12, and a graphic board 20 that outputs video (image) signals. The graphic board 20 is connected to a display 50 or the projectors 150 via a video output interface.

The south bridge 16 is connected to a PCI port 22, a Local Area Network (LAN) port 24, an IEEE 1394 port 26, a USB port 28, an auxiliary storage device 30, an audio input/output 32, and serial port 34. The auxiliary storage device 30 may be a Hard Disk Drive (HDD), a Solid State Drive (SSD), or the like, and stores an Operation System (OS) for controlling the computer apparatus, programs for implementing the function units described above, various kinds of system information, and various kinds of setting information. The LAN port 24 is an interface device to connect the general-purpose computer apparatus 110 to a network by wired or wireless connection. The LAN port 24 is used for transmitting the above described notice for requesting the maintenance.

The USB port 28 may be connected to an input device 170 such as a keyboard 52 and a mouse 54. The USB port 28 may provide a user interface for receiving, from an operator, input of various instructions such as instructions to move the reference points. The general-purpose computer apparatus 110 according to the embodiment reads programs from the auxiliary storage device 30, and loads the programs in the work space provided by the RAM 18, to realize the function units and processes described above can be realized under the control of the CPU 12. It should be noted that although the projectors 150 and the camera 160 are not particularly described, the projectors 150 and the camera 160 includes hardware such as a CPU and a RAM and dedicated hardware for specific purposes.

As described above, according to an embodiment of the present invention, when projecting the image as the whole from the plurality of projection units, the projected area can be detected based on the one or more captured images in which the images for calibration being projected are captured, and the image as the whole can be calibrated to fit in the projected area.

In the above description about the embodiment, a case (configuration) is described in which the projection images of the three projectors 150a through 150c are arranged in a line in the horizontal line to project the image as the whole. However, an embodiment of the multiple projection to which the calibration process and the recalibration process according to the embodiment can be applied is not limited to the above configuration. The number of the projectors 150 is not limited to 3. Any arbitrary number of the projectors 150 may be used. Further, the projection manner is not limited to one line in the horizontal direction. For example, the projection images (projectors) may be arranged in one line in the vertical direction. Further, the projection images (projectors) may be arranged in two or more lines.

It should be noted that the above function units can be implemented by a computer-executable program written in a legacy programming language such as assembler, C, C++, C#, and Java (registered trademark), or another object oriented programming language, and may be distributed by being stored in a device-readable recording medium such as a Read-Only Memory (ROM), an Electrically Erasable Programmable ROM (EEPROM), an EPROM, a flash memory, a flexible disk, a Compact Disc ROM (CD-ROM), a CD-ReWritable (CD-RW), a Digital Versatile Disk ROM (DVD-ROM), a DVD-RAM, a DVD-RW, a Blu-ray disk, an SD card, and a Magneto-Optical disk (MO) or through electric communication lines.

Further, the present invention is not limited to these embodiments, but various variations and modifications may be made without departing from the scope of the present invention.

The present application is based on and claims the benefit of priority of Japanese Priority Application No. 2015-072349 filed on Mar. 31, 2015, with the Japanese Patent Office, the entire contents of which are hereby incorporated by reference.

What is claimed is:

1. A projection system comprising:
   a plurality of projectors to project images to form an image as a whole on a projected area which is a screen area on which a content image is projected without a frame;
   circuitry configured to perform:
   outputting images for calibration to projectors that are in charge of areas of corners of the projected area among the plurality of projectors, the images for calibration including positioning markers that are indications for positioning to the corners of the projected area;
   detecting, based on one or more captured images for calibration that are acquired by capturing the projected area and the images for calibration including the positioning markers being projected, reference points that characterize the projected area, the reference points being different from the positioning markers that are indications for positioning to the corners of the projected area; and
   calculating correction coefficients, based on the reference points of the projected area, and defining a projection target area which corresponds to the screen area, the correction coefficients corresponding to the plurality of projectors, the image as the whole corrected based on the correction coefficients being projected to the projection target area from the plurality of projectors,
wherein the reference points are detected by detecting a first set of points in line with at least one of the position markers, and detecting a second set of points, corresponding to points of the first set of points, the second set of points displaced outwardly on the projected area relative to the first set of points, the second set of points corresponding to the reference points.

2. The projection system according to claim 1, wherein the circuitry configured to detect is configured to detect, in areas starting from detection positions of the positioning markers, boundaries between a background and the projected area in the images for calibration being projected to detect the reference points.

3. The projection system according to claim 1,
wherein, in a case in which one or more of the reference points, which characterize the projected area, are not detected by the detecting, the detecting uses detection positions of the positioning markers as default values for the one or more of the reference points that are undetected, and
wherein the projection system includes circuitry configured to receive an instruction to move the reference points.

4. The projection system according to claim 1, further comprising:
circuitry configured to control, in response to an event, re-execution in which the images for calibration are projected again, the projected area and the images for calibration being projected are captured again, the reference points that characterize the projected area are detected again, and the correction coefficients that correspond to the plurality of projectors are calculated again.

5. The projection system according to claim 4, further comprising:
a memory configured to store the reference points that define the projected area when calculating the correction coefficients,
wherein in a case in which one or more of the reference points, which characterize the projected area, are not detected by the detecting, the detecting uses, when executing the re-execution, the reference points stored in the memory for the one or more of the reference points that are undetected.

6. The projection system according to claim 4, further comprising:
a memory to register in which a contact address that has been set previously is registered; and
a transmitter to transmit, to the contact address registered in the memory to register, notice for requesting maintenance in a case in which an error occurs when executing the re-execution.

7. The projection system according to claim 6, wherein:
the transmitter is configured to transmit, in addition to the notice for requesting the maintenance, at least one of a captured image in which projection status of the projectors is captured before executing the re-execution in which the error occurs, one or more captured images for calibration when executing the re-execution in which the error occurs, an intermediate result of pattern recognition from the one or more captured images for calibration, and a captured image in which projection status of the projectors is captured after executing the re-execution in which the error occurs.

8. The projection system according to claim 1, wherein the circuitry is further configured to perform:
determining an equation which estimates an edge of the projected area using the second set of points.

9. The projection system according to claim 8, wherein:
the determining the equation utilizes a least squares method to determine the equation which is a linear equation.

10. An image processing apparatus for projecting, from a plurality of projectors, images to form an image as a whole on a projected area which is a screen area on which a content image is projected without a frame; the image processing apparatus communicating with the plurality of projectors, the image processing apparatus comprising:
circuitry configured to perform:
outputting images for calibration to projectors that are in charge of areas of corners of the projected area among the plurality of projectors, the images for calibration including positioning markers that are indications for positioning to the corners of the projected area;
detecting, based on one or more captured images for calibration that are acquired by capturing the projected area and the images for calibration including the positioning markers being projected, reference points that characterize the projected area, the reference points being outside of the positioning markers; and
calculating correction coefficients, based on the reference points of the projected area, and defining a projection target area which corresponds to the screen area, the correction coefficients corresponding to the plurality of projectors, the image as the whole corrected based on the correction coefficients being projected to the projection target area from the plurality of projectors,
wherein the reference points are detected by detecting a first set of points in line with at least one of the position markers, and detecting a second set of points, corresponding to points of the first set of points, the second set of points displaced outwardly on the projected area relative to the first set of points, the second set of points corresponding to the reference points.

11. The image processing apparatus according to claim 10, wherein the circuitry is further configured to perform:
determining an equation which estimates an edge of the projected area using the second set of points.

12. The projection system according to claim 11, wherein:
the determining the equation utilizes a least squares method to determine the equation which is a linear equation.

13. A calibration method executed by a computer for projecting, from a plurality of projectors, images to form an image as a whole on a projected area which is a screen area on which a content image is projected without a frame, the calibration method comprising:
a step of causing projectors that are in charge of areas of corners of the projected area among the plurality of projectors to project images for calibration including positioning markers that are indications for positioning to the corners of the projected area;
a step of receiving input of on one or more captured images for calibration that are acquired by capturing the projected area and the images for calibration including positioning markers being projected;
a step of detecting reference points that characterize the projected area based on the one or more captured images for calibration, the reference points being outside of the positioning markers; and a step of defining a projection target area which corresponds to the screen area and calculating correction coefficients that correspond to the plurality of projectors, the image as the whole corrected based on the correction coefficients being projected to the projection target area from the plurality of projectors, wherein the reference points are detected by detecting a first set of points in line with at least one of the position markers, and detecting a second set of points, corresponding to points of the first set of points, the second set of points displaced outwardly on the projected area relative to the first set of points, the second set of points corresponding to the reference points.

14. The method according to claim 13, further comprising:

determining an equation which estimates an edge of the projected area using the second set of points.

15. The method according to claim 14, wherein:

the determining the equation utilizes a least squares method to determine the equation which is a linear equation.

* * * * *